US011261360B2

(12) United States Patent
Smith et al.

(10) Patent No.: US 11,261,360 B2
(45) Date of Patent: *Mar. 1, 2022

(54) STABILIZED HEAT TRANSFER COMPOSITIONS, METHODS AND SYSTEMS

(71) Applicant: HONEYWELL INTERNATIONAL INC., Morris Plains, NJ (US)

(72) Inventors: Gregory Laurence Smith, Niagara Falls (CA); Ankit Sethi, Charlotte, NC (US); Yang Zou, Charlotte, NC (US); Samuel F Yana Motta, Charlotte, NC (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/726,555

(22) Filed: Dec. 24, 2019

(65) Prior Publication Data

US 2020/0131417 A1 Apr. 30, 2020

Related U.S. Application Data

(63) Continuation-in-part of application No. 16/371,866, filed on Apr. 1, 2019, now abandoned, and a continuation-in-part of application No. 16/153,733, filed on Oct. 6, 2018, now Pat. No. 10,815,409, and a continuation-in-part of application No. 16/135,962, filed on Sep. 19, 2018, now Pat. No. 11,008,494, said application No. 16/371,866 is a continuation of application No. 15/661,980, filed on Jul. 27, 2017, now Pat. No. 10,246,621, which is a continuation of application No. PCT/US2017/044182, filed on Jul. 27, 2017.

(60) Provisional application No. 62/786,826, filed on Dec. 31, 2018, provisional application No. 62/786,812, filed on Dec. 31, 2018, provisional application No. 62/786,802, filed on Dec. 31, 2018, provisional application No. 62/593,393, filed on Dec. 1, 2017, provisional application No. 62/569,419, filed on Oct. 6, 2017, provisional application No. 62/502,231, filed on May 5, 2017, provisional application No.
(Continued)

(51) Int. Cl.
| | |
|---|---|
| *C09K 5/04* | (2006.01) |
| *C10M 105/50* | (2006.01) |
| *C10M 171/00* | (2006.01) |
| *F25B 31/00* | (2006.01) |
| *F25B 45/00* | (2006.01) |
| *C10M 105/38* | (2006.01) |
| *C10M 111/02* | (2006.01) |
| *C10N 20/00* | (2006.01) |
| *C10N 30/08* | (2006.01) |
| *C10N 40/30* | (2006.01) |

(52) U.S. Cl.
CPC .............. *C09K 5/044* (2013.01); *C09K 5/045* (2013.01); *C10M 105/38* (2013.01); *C10M 105/50* (2013.01); *C10M 111/02* (2013.01); *C10M 171/008* (2013.01); *F25B 31/002* (2013.01); *F25B 45/00* (2013.01); *C09K 2205/122* (2013.01); *C09K 2205/22* (2013.01); *C10M 2203/024* (2013.01); *C10M 2203/06* (2013.01); *C10M 2203/10* (2013.01); *C10M 2207/2835* (2013.01); *C10M 2211/022* (2013.01); *C10M 2211/0206* (2013.01); *C10M 2215/202* (2013.01); *C10M 2215/204* (2013.01); *C10M 2223/041* (2013.01); *C10M 2223/049* (2013.01); *C10N 2020/101* (2020.05); *C10N 2020/103* (2020.05); *C10N 2030/08* (2013.01); *C10N 2040/30* (2013.01)

(58) Field of Classification Search
CPC ........ C09K 2205/126; C09K 2205/122; C09K 2205/22; C09K 5/044; C10M 2207/2835; C10M 2209/1055; C10M 2209/1085; C10M 2203/065; C10M 2203/1045; C10M 2203/1065; C10M 2205/223; C10M 2209/1023
See application file for complete search history.

(56) References Cited

U.S. PATENT DOCUMENTS

| | | | |
|---|---|---|---|
| 5,198,134 A | 3/1993 | Steinberg et al. | |
| 9,938,442 B2 * | 4/2018 | Spatz | ..................... C09K 5/045 |
| 10,208,235 B2 * | 2/2019 | Sethi | ..................... C10M 105/38 |

(Continued)

FOREIGN PATENT DOCUMENTS

| | | |
|---|---|---|
| WO | 2018022888 A1 | 2/2018 |
| WO | 2018022943 A1 | 2/2018 |
| WO | 2018022949 A2 | 2/2018 |

OTHER PUBLICATIONS

M. J. Hourani et al; "Alkylated Naphthalenes as High-Performance Synthetic Lubricating Fluids" Tribology Transactions, 50, 2007 pp. 82-87.

(Continued)

*Primary Examiner* — John R Hardee
(74) *Attorney, Agent, or Firm* — Colleen D. Szuch

(57) ABSTRACT

The present invention relates to heat transfer compositions comprising refrigerant, lubricant and stabilizer, wherein the refrigerant comprises about 49% by weight difluoromethane (HFC-32), about 11.5% by weight pentafluoroethane (HFC-125), and about 39.5% by weight trifluoroiodomethane ($CF_3I$), and wherein said lubricant comprises polyol ester (POE) lubricant and/or polyvinyl ether (PVE) lubricant, and wherein said stabilizer comprises an alkylated naphthalene and optionally but preferably an acid depleting moiety.

20 Claims, No Drawings

Related U.S. Application Data

62/502,165, filed on May 5, 2017, provisional application No. 62/368,521, filed on Jul. 29, 2016.

(56) References Cited

U.S. PATENT DOCUMENTS

| | | | |
|---|---|---|---|
| 10,246,621 B2* | 4/2019 | Sethi | F25B 31/002 |
| 10,815,409 B2* | 10/2020 | Sethi | C09K 5/045 |
| 2010/0234256 A1* | 9/2010 | Sato | C09K 5/045 |
| | | | 508/463 |
| 2010/0257881 A1* | 10/2010 | Perti | C09K 5/045 |
| | | | 62/115 |
| 2013/0207024 A1* | 8/2013 | Takigawa | C10M 1/00 |
| | | | 252/68 |
| 2021/0179907 A1* | 6/2021 | Petersen | F25B 45/00 |

OTHER PUBLICATIONS

International Search Report from PCT/US2019/068931 dated Apr. 29, 2020; pp. 3.

* cited by examiner

STABILIZED HEAT TRANSFER COMPOSITIONS, METHODS AND SYSTEMS

CROSS REFERENCE TO RELATED APPLICATIONS

The present application claims the priority benefit of US Provisional Nos. 62/786,812, having a filing date of Dec. 31, 2018, which is incorporated herein by reference.

The present application claims the priority benefit of U.S. Provisional 62/786,802, having a filing date of Dec. 31, 2018, which is incorporated herein by reference.

The present application claims the priority benefit of U.S. Provisional 62/786,826, having a filing date of Dec. 31, 2018, which is incorporated herein by reference.

The present application is related to and claims the priority benefit as a continuation in part of U.S. application Ser. No. 16/153,733 filed Oct. 6, 2018, now U.S. Pat. No. 10,815,819, which in turn claims the priority benefit of each of: U.S. Provisional 62/569,419, filed Oct. 6, 2017; and U.S. Provisional 62/593,393, filed Dec. 1, 2017, with each application mentioned in this paragraph being incorporated herein by reference.

The present invention is related to as a continuation-in-part of U.S. application Ser. No. 16/371,866 filed Apr. 1, 2019, now abandoned, which in turn is a continuation of U.S. application Ser. No. 15/661,980, now U.S. Pat. No. 10,246,621 and a continuation of PCT Application No. PCT/US17/44182, filed Jul. 27, 2017, which claims the priority benefit of each of the following U.S. Provisional Application Nos. 62/502,165; 62/502,231; and 62/368,521, with each application mentioned in this paragraph incorporated herein by reference.

The present application is related to and claims the priority benefit as a continuation-in-part of U.S. application Ser. No. 16/135,962 filed Sep. 19, 2018, now U.S. Pat. No. 11,008,494, which is incorporated herein by reference.

FIELD OF THE INVENTION

The present invention relates to compositions, methods and systems having utility in heat exchange applications, including in air conditioning and refrigeration applications. In particular aspects the invention relates to compositions useful in heat transfer systems of the type in which the refrigerant R-410A would have been used. The compositions of the invention are useful in particular as a replacement of the refrigerant R-410A for heating and cooling applications and to retrofitting heat exchange systems, including systems designed for use with R-410A.

BACKGROUND

Mechanical refrigeration systems, and related heat transfer devices, such as heat pumps and air conditioners are well known in the art for industrial, commercial and domestic uses. Chlorofluorocarbons (CFCs) were developed in the 1930s as refrigerants for such systems. However, since the 1980s, the effect of CFCs on the stratospheric ozone layer has become the focus of much attention. In 1987, a number of governments signed the Montreal Protocol to protect the global environment, setting forth a timetable for phasing out the CFC products. CFCs were replaced with more environmentally acceptable materials that contain hydrogen, namely the hydrochlorofluorocarbons (HCFCs).

One of the most commonly used hydrochlorofluorocarbon refrigerants was chlorodifluoromethane (HCFC-22). However, subsequent amendments to the Montreal protocol accelerated the phase out of the CFCs and scheduled the phase-out of HCFCs, including HCFC-22.

In response to the need for a non-flammable, non-toxic alternative to the CFCs and HCFCs, industry has developed a number of hydrofluorocarbons (HFCs) which have zero ozone depletion potential. R-410A (a 50:50 w/w blend of difluoromethane (HFC-32) and pentafluoroethane (HFC-125)) was adopted as the industry replacement for HCFC-22 in air conditioning and chiller applications as it does not contribute to ozone depletion. However, R-410A is not a drop-in replacement for R-22. Thus, the replacement of R-22 with R-410A required the redesign of major components within heat exchange systems, including the replacement and redesign of the compressor to accommodate the substantially higher operating pressure and volumetric capacity of R-410A, when compared with R-22.

While R-410A has a more acceptable Ozone Depleting Potential (ODP) than R-22, the continued use of R-410A is problematic since it has a high Global Warming Potential (GWP) of 2088. There is therefore a need in the art for the replacement of R-410A with a more environmentally acceptable alternative.

It is understood in the art that it is highly desirable for a replacement heat transfer fluid to possess a difficult to achieve mosaic of properties including excellent heat transfer properties (and in particular heat transfer properties that are well matched to the needs of the particular application), chemical stability, low or no toxicity, non-flammability, lubricant miscibility and/or lubricant compatibility amongst others. In addition, any replacement for R-410A would ideally be a good match for the operating conditions of R-410A in order to avoid modification or redesign of the system. The development of a heat transfer fluid meeting all of these requirements, many of which are unpredictable, is a significant challenge.

With regard to efficiency in use, it is important to note that a loss of refrigerant thermodynamic performance or energy efficiency may result in an increase in fossil fuel usage as a result of the increased demand for electrical energy. The use of such a refrigerant will therefore have a negative secondary environmental impact.

Flammability is considered to be an important property for many heat transfer applications. As used herein, the term "non-flammable" refers to compounds or compositions which are determined to be non-flammable in accordance with ASTM standard E-681-2009 Standard Test Method for Concentration Limits of Flammability of Chemicals (Vapors and Gases) at conditions described in ASHRAE Standard 34-2016 Designation and Safety Classification of Refrigerants and described in Appendix B1 to ASHRAE Standard 34-2016, which is incorporated herein by reference and referred to herein for convenience as "Non-Flammability Test".

It is very important for maintenance of system efficiency and proper and reliable functioning of the compressor, that lubricant circulating in a vapour compression heat transfer system is returned to the compressor to perform its intended lubricating function. Otherwise, lubricant might accumulate and become lodged in the coils and piping of the system, including in the heat transfer components. Furthermore, when lubricant accumulates on the inner surfaces of the evaporator, it lowers the heat exchange efficiency of the evaporator, and thereby reduces the efficiency of the system.

R-410A is currently commonly used with polyol ester (POE) lubricating oil in air conditioning applications, as R-410A is miscible with POE at temperatures experienced during use of such systems. However, R-410A is immiscible with POE at temperatures typically experienced during operation of low temperature refrigeration systems, and heat pump systems. Therefore, unless steps are taken to mitigate against this immiscibility, POE and R-410A cannot be used in low temperature refrigeration or heat pump systems.

Applicants have come to appreciate that it is desirable to be able to provide compositions which are capable of being used as a replacement for R-410A in air conditioning applications, and in particular in residential air conditioning and commercial air conditioning applications, which include, rooftop air conditioning, variable refrigerant flow (VRF) air conditioning and chiller air conditioning applications. Applicants have also come to appreciate that the present compositions, methods and systems have advantage in, for example, heat pump and low temperature refrigeration systems, wherein the drawback of immiscibility with POE at temperatures experienced during operation is eliminated.

SUMMARY

The present invention provides refrigerant compositions which can be used as a replacements for R-410A and which exhibit in preferred embodiments the desired mosaic of properties of excellent heat transfer properties, chemical stability, low or no toxicity, non-flammability, lubricant miscibility and lubricant compatibility in combination with low GWP and near zero ODP.

The present invention includes heat transfer compositions comprising refrigerant, lubricant and stabilizer, said refrigerant consisting essentially of: the following three compounds, with each compound being present in the following relative percentages:
about 49% by weight difluoromethane (HFC-32),
about 11.5% by weight pentafluoroethane (HFC-125), and
about 39.5% by weight trifluoroiodomethane (CF3I),
said lubricant comprising polyol ester (POE) lubricant and/or polyvinyl ether (PVE) lubricant, and said stabilizer comprising alkylated naphthalene, wherein said alkylated naphthalene is present in the composition in an amount of from 1% to less than 10% by weight based on the weight of the alkylated naphthalene and the lubricant. The heat transfer composition according to this paragraph is sometimes referred to herein for convenience as Heat Transfer Composition 1.

As used herein with respect to percentages based on a list of identified compounds, the term "relative percentage" means the percentage of the identified compound based on the total weight of the listed compounds.

As used herein with respect to weight percentages, the term "about" with respect to an amount of an identified component means the amount of the identified component can vary by an amount of +/−2% by weight.

In connection with the use of stabilizers comprising alkylated naphthalene in heat transfer compositions comprising CF3I refrigerants and lubricant that comprises POE and/or PVE, applicants have found that a critical range exists in which the stabilizing effect of the alkylated naphthalene is beneficially and unexpectedly enhanced relative to the stabilizing effect outside of the range of from 1% to less than 10% by weight based on the alkylated naphthalene and the lubricant, or preferably from 1.5% to less than 8%, or preferably from 1.5% to about 6%, or preferably from 1.5 to 5%. The reason for the enhanced performance within this critical range derives from the discovery that stabilizing performance of the alkylated naphthalene can, in the absence of other solutions described hereinafter, be deteriorate to an undesirable extent for some applications when used in amounts above about 10%. Furthermore, applicants believe that the stabilizing performance of alkylated naphthalene also is less than desirable for some applications when used in amounts of less than 1%. The existence of this critical range is unexpected.

Accordingly, the present invention also includes heat transfer compositions comprising refrigerant, lubricant and stabilizer, said refrigerant consisting essentially of the following three compounds, with each compound being present in the following relative percentages:
about 49% by weight difluoromethane (HFC-32),
about 11.5% by weight pentafluoroethane (HFC-125), and
about 39.5% by weight trifluoroiodomethane (CF$_3$I),
said lubricant comprising POE lubricant and/or polyvinyl ether (PVE) lubricant, and said stabilizer comprising alkylated naphthalene, wherein said alkylated naphthalene is present in an amount of from 1% to 8% by weight based on the weight of the alkylated naphthalene and the lubricant. The heat transfer composition according to this paragraph is sometimes referred to herein for convenience as Heat Transfer Composition 2.

The present invention includes heat transfer compositions comprising refrigerant, lubricant and stabilizer, said refrigerant consisting essentially of the following three compounds, with each compound being present in the following relative percentages:
about 49% by weight difluoromethane (HFC-32),
about 11.5% by weight pentafluoroethane (HFC-125), and
about 39.5% by weight trifluoroiodomethane (CF$_3$I),
said lubricant comprising POE lubricant and/or polyvinyl ether (PVE) lubricant, and said stabilizer comprising alkylated naphthalene, wherein said alkylated naphthalene is present in an amount of from 1.5% to 8% by weight based on the weight of the alkylated naphthalene and the lubricant. The heat transfer composition according to this paragraph is sometimes referred to herein for convenience as Heat Transfer Composition 3.

The present invention includes heat transfer compositions comprising refrigerant, lubricant and stabilizer, said refrigerant consisting essentially of the following three compounds, with each compound being present in the following relative percentages:
about 49% by weight difluoromethane (HFC-32),
about 11.5% by weight pentafluoroethane (HFC-125), and
about 39.5% by weight trifluoroiodomethane (CF$_3$I),
said lubricant comprising POE lubricant and/or polyvinyl ether (PVE) lubricant, and said stabilizer comprising alkylated naphthalene, wherein said alkylated naphthalene is present in an amount of from 1.5% to 6% by weight based on the weight of the alkylated naphthalene and the lubricant. The heat transfer composition according to this paragraph is sometimes referred to herein for convenience as Heat Transfer Composition 4.

The present invention includes heat transfer compositions comprising refrigerant, lubricant and stabilizer, said refrigerant consisting essentially of the following three compounds, with each compound being present in the following relative percentages:
49%+/−0.3% by weight difluoromethane (HFC-32),
11.5%+/−0.3% by weight pentafluoroethane (HFC-125), and
39.5%+/−0.3% by weight trifluoroiodomethane (CF3I),
said lubricant comprising POE lubricant and/or polyvinyl ether (PVE) lubricant, and said stabilizer comprising alkylated naphthalene, wherein said alkylated naphthalene is present in an amount of from 1% to less than 10% by weight based on the weight of the alkylated naphthalene and the lubricant. The heat transfer composition according to this paragraph is sometimes referred to herein for convenience as Heat Transfer Composition 5.

The present invention includes heat transfer compositions comprising refrigerant, lubricant and stabilizer, said refrigerant consisting essentially of the following three compounds, with each compound being present in the following relative percentages:
49%+/−0.3% by weight difluoromethane (HFC-32),
11.5%+/−0.3% by weight pentafluoroethane (HFC-125), and
39.5%+/−0.3% by weight trifluoroiodomethane ($CF_3I$), said lubricant comprising POE lubricant and/or polyvinyl ether (PVE) lubricant, and said stabilizer comprising alkylated naphthalene, wherein said alkylated naphthalene is present in an amount of from 1% to 8% by weight based on the weight of the alkylated naphthalene and the lubricant. The heat transfer composition according to this paragraph is sometimes referred to herein for convenience as Heat Transfer Composition 6.

The present invention includes heat transfer compositions comprising refrigerant, lubricant and stabilizer, said refrigerant consisting essentially of the following three compounds, with each compound being present in the following relative percentages:
49%+/−0.3% by weight difluoromethane (HFC-32),
11.5%+/−0.3% by weight pentafluoroethane (HFC-125), and
3.5%+/−0.3% by weight trifluoroiodomethane ($CF_3I$), said lubricant comprising POE lubricant and/or polyvinyl ether (PVE) lubricant, and said stabilizer comprising alkylated naphthalene, wherein said alkylated naphthalene is present in an amount of from 1.5% to 8% by weight based on the weight of the alkylated naphthalene and the lubricant. The heat transfer composition according to this paragraph is sometimes referred to herein for convenience as Heat Transfer Composition 7.

The present invention includes heat transfer compositions comprising refrigerant, lubricant and stabilizer, said refrigerant consisting essentially of the following three compounds, with each compound being present in the following relative percentages:
49%+/−0.3% by weight difluoromethane (HFC-32),
11.5%+/−0.3% by weight pentafluoroethane (HFC-125), and
39.5%+/−0.3% by weight trifluoroiodomethane ($CF_3I$), said lubricant comprising POE lubricant and/or polyvinyl ether (PVE) lubricant, and said stabilizer comprising alkylated naphthalene, wherein said alkylated naphthalene is present in an amount of from 1.5% to 6% by weight based on the weight of the alkylated naphthalene and the lubricant. The heat transfer composition according to this paragraph is sometimes referred to herein for convenience as Heat Transfer Composition 8.

The present invention also includes any of Heat Transfer Compositions 1-8 wherein said stabilizer is essentially free of an ADM as defined hereinafter. The heat transfer composition according to this paragraph is sometimes referred to herein for convenience as Heat Transfer Composition 8A.

The present invention also includes any of Heat Transfer Compositions 1-8 wherein said stabilizer is essentially free of an ADM and wherein said stabilizer further comprises BHT. The heat transfer composition according to this paragraph is sometimes referred to herein for convenience as Heat Transfer Composition 8B.

The present invention also includes heat transfer compositions comprising refrigerant, lubricant and stabilizer, said refrigerant consisting essentially of the following three compounds, with each compound being present in the following relative percentages: about 49% by weight difluoromethane (HFC-32),
about 11.5% by weight pentafluoroethane (HFC-125), and
about 39.5% by weight trifluoroiodomethane ($CF_3I$),
said lubricant comprising POE lubricant and/or polyvinyl ether (PVE) lubricant, and said stabilizer comprising alkylated naphthalene and an acid depleting moiety. The heat transfer composition according to this paragraph is sometimes referred to herein for convenience as
Heat Transfer Composition 9.

As used herein, the term "acid depleting moiety" (which is sometimes referred to herein for convenience as "ADM") means a compound or radical which when present in a heat transfer composition comprising a refrigerant that contains about 10% by weigh or greater of CF3I (said percentage being based in the weight of all the refrigerants in the heat transfer composition), has the effect of substantially reducing the acid moieties that would otherwise be present in the heat transfer composition. As used herein, the term "substantially reducing" as used with respect to the acid moieties in the heat transfer composition means that acid moieties are reduced sufficiently to result in a reduction in TAN value (as defined hereinafter) of at least about 10 relative percent.

In connection with the use of stabilizers comprising alkylated naphthalene and an ADM, applicants have found that certain materials are able to substantially and unexpectedly enhance the performance of stabilizers which comprise or consist essentially of alkylated naphthalene stabilizer(s). In particular, applicants have found that certain materials are able to aid in the depletion of acidic moieties in heat transfer compositions containing CF3I, including any heat transfer compositions of the present invention. Applicants have found that formulating heat transfer compositions to have an ADM provides an unexpected and synergistic enhancement to the stability function of at least the alkylated naphthalene stabilizers according to the present invention. The reason for this synergistic effect is not understood with certainty, but without being bound by or to any theory of operation, it is believed that the alkylated naphthalene stabilizers of the present invention function in large part by stabilizing free radicals formed from the CF3I of the present refrigerants, but that this stabilizing effect is at least somewhat diminished in the presence of acid moieties. As a result, the presence of the ADM of the present invention allows the alkylated naphthalene stabilizers to perform with an unexpected and synergistically enhanced effect. Furthermore, applicants have found that the deterioration in performance which applicants have observed at relatively high concentrations of alkylated naphthalene (i.e., about 10%) can be counteracted by the incorporation into the heat transfer composition (or into a stabilized lubricant) of an ADM.

The present invention therefore includes stabilizer comprising an alkylated naphthalene and an ADM. The stabilizer according to this paragraph is sometimes referred to herein for convenience as Stabilizer 1.

The present invention also includes stabilizer comprising from about 40% by weight to about 99.9% of alkylated naphthalenes and from 0.05% to about 50% by weight of ADM based on the weight of the stabilizer. The stabilizer according to this paragraph is sometimes referred to herein for convenience as Stabilizer 2.

The present invention also includes stabilizer comprising from about 50% by weight to about 99.9% of alkylated naphthalenes and an from 0.1% to about 50% by weight of ADM based on the weight of the stabilizer. The stabilizer according to this paragraph is sometimes referred to herein for convenience as Stabilizer 3.

The present invention also includes stabilizer comprising from about 40% by weight to about 95% of alkylated naphthalenes and an from 5% to about 30% by weight of ADM based on the weight of the alkylated naphthalenes and ADM in the stabilizer. The stabilizer according to this paragraph is sometimes referred to herein for convenience as Stabilizer 4.

The present invention also includes stabilizer comprising from about 40% by weight to about 95% of alkylated naphthalenes and an from 5% to about 20% by weight of ADM based on the weight of the alkylated naphthalenes and ADM in the stabilizer. The stabilizer according to this paragraph is sometimes referred to herein for convenience as Stabilizer 5.

The present invention also includes heat transfer compositions comprising refrigerant, lubricant comprising POE lubricant and/or polyvinyl ether (PVE) lubricant and Stabilizer 2, said refrigerant consisting essentially of the following three compounds, with each compound being present in the following relative percentages:
about 49% by weight difluoromethane (HFC-32),
about 11.5% by weight pentafluoroethane (HFC-125), and
about 39.5% by weight trifluoroiodomethane ($CF_3I$). The heat transfer composition according to this paragraph is sometimes referred to herein for convenience as Heat Transfer Composition 10.

The present invention also includes heat transfer compositions comprising refrigerant, lubricant comprising POE lubricant and/or polyvinyl ether (PVE) lubricant and Stabilizer 4, said refrigerant consisting essentially of the following three compounds, with each compound being present in the following relative percentages:
about 49% by weight difluoromethane (HFC-32),
about 11.5% by weight pentafluoroethane (HFC-125), and
about 39.5% by weight trifluoroiodomethane ($CF_3I$). The heat transfer composition according to this paragraph is sometimes referred to herein for convenience as Heat Transfer Composition 11.

The present invention also includes heat transfer compositions comprising refrigerant, lubricant comprising POE lubricant and/or polyvinyl ether (PVE) lubricant and Stabilizer 5, said refrigerant consisting essentially of the following three compounds, with each compound being present in the following relative percentages:
about 49% by weight difluoromethane (HFC-32),
about 11.5% by weight pentafluoroethane (HFC-125), and
about 39.5% by weight trifluoroiodomethane ($CF_3I$). The heat transfer composition according to this paragraph is sometimes referred to herein for convenience as Heat Transfer Composition 12.

The present invention includes heat transfer compositions comprising refrigerant, lubricant and Stabilizer 1, said refrigerant consisting essentially of the following three compounds, with each compound being present in the following relative percentages:
49%+/−0.3% by weight difluoromethane (HFC-32),
11.5%+/−0.3% by weight pentafluoroethane (HFC-125), and
39.5%+/−0.3% by weight trifluoroiodomethane ($CF_3I$), said lubricant comprising POE lubricant and/or polyvinyl ether (PVE) lubricant, The heat transfer composition according to this paragraph is sometimes referred to herein for convenience as Heat Transfer Composition 13.

The present invention includes heat transfer compositions comprising refrigerant, lubricant and Stabilizer 2, said refrigerant consisting essentially of the following three compounds, with each compound being present in the following relative percentages:
49%+/−0.3% by weight difluoromethane (HFC-32),
11.5%+/−0.3% by weight pentafluoroethane (HFC-125), and
39.5%+/−0.3% by weight trifluoroiodomethane ($CF_3I$), said lubricant comprising POE lubricant and/or polyvinyl ether (PVE) lubricant, The heat transfer composition according to this paragraph is sometimes referred to herein for convenience as Heat Transfer Composition 14.

The present invention includes heat transfer compositions comprising refrigerant, lubricant and Stabilizer 3, said refrigerant consisting essentially of the following three compounds, with each compound being present in the following relative percentages:
49%+/−0.3% by weight difluoromethane (HFC-32),
11.5%+/−0.3% by weight pentafluoroethane (HFC-125), and
39.5%+/−0.3% by weight trifluoroiodomethane ($CF_3I$), said lubricant comprising POE lubricant and/or polyvinyl ether (PVE) lubricant, The heat transfer composition according to this paragraph is sometimes referred to herein for convenience as Heat Transfer Composition 15.

The present invention includes heat transfer compositions comprising refrigerant, lubricant and Stabilizer 4, said refrigerant consisting essentially of the following three compounds, with each compound being present in the following relative percentages:
49%+/−0.3% by weight difluoromethane (HFC-32),
11.5%+/−0.3% by weight pentafluoroethane (HFC-125), and
39.5%+/−0.3% by weight trifluoroiodomethane ($CF_3I$), said lubricant comprising POE lubricant and/or polyvinyl ether (PVE) lubricant, The heat transfer composition according to this paragraph is sometimes referred to herein for convenience as Heat Transfer Composition 16.

The present invention includes heat transfer compositions comprising refrigerant, lubricant and Stabilizer 5, said refrigerant consisting essentially of the following three compounds, with each compound being present in the following relative percentages:
49%+/−0.3% by weight difluoromethane (HFC-32),
11.5%+/−0.3% by weight pentafluoroethane (HFC-125), and
39.5%+/−0.3% by weight trifluoroiodomethane ($CF_3I$), said lubricant comprising POE lubricant and/or polyvinyl ether (PVE) lubricant, The heat transfer composition according to this paragraph is sometimes referred to herein for convenience as Heat Transfer Composition 17.

The present invention also includes stabilized lubricants comprising: (a) POE lubricant and/or polyvinyl ether (PVE) lubricant; and (b) a stabilizer of the present invention.

DESCRIPTION

Definitions

For the purposes of this invention, the term "about" in relation to temperatures in degrees centigrade (° C.) means that the stated temperature can vary by an amount of +/−5° C. In preferred embodiments, temperature specified as being about is preferably +/−2° C., more preferably +/−1° C., and even more preferably +/−0.5° C. of the identified temperature.

The term "capacity" is the amount of cooling provided, in BTUs/hr, by the refrigerant in the refrigeration system. This is experimentally determined by multiplying the change in enthalpy in BTU/lb, of the refrigerant as it passes through the evaporator by the mass flow rate of the refrigerant. The enthalpy can be determined from the measurement of the pressure and temperature of the refrigerant. The capacity of the refrigeration system relates to the ability to maintain an area to be cooled at a specific temperature. The capacity of a refrigerant represents the amount of cooling or heating that it provides and provides some measure of the capability of a compressor to pump quantities of heat for a given volumetric flow rate of refrigerant. In other words, given a specific compressor, a refrigerant with a higher capacity will deliver more cooling or heating power.

The phrase "coefficient of performance" (hereinafter "COP") is a universally accepted measure of refrigerant performance, especially useful in representing the relative thermodynamic efficiency of a refrigerant in a specific heating or cooling cycle involving evaporation or condensation of the refrigerant. In refrigeration engineering, this term expresses the ratio of useful refrigeration or cooling capacity to the energy applied by the compressor in compressing the vapor and therefore expresses the capability of a given compressor to pump quantities of heat for a given volumetric flow rate of a heat transfer fluid, such as a refrigerant. In other words, given a specific compressor, a refrigerant with a higher COP will deliver more cooling or heating power. One means for estimating COP of a refrigerant at specific operating conditions is from the thermodynamic properties of the refrigerant using standard refrigeration cycle analysis techniques (see for example, R.C. Downing, FLUOROCARBON REFRIGERANTS HANDBOOK, Chapter 3, Prentice-Hall, 1988 which is incorporated herein by reference in its entirety).

The phrase "discharge temperature" refers to the temperature of the refrigerant at the outlet of the compressor. The advantage of a low discharge temperature is that it permits the use of existing equipment without activation of the thermal protection aspects of the system which are preferably designed to protect compressor components and avoids the use of costly controls such as liquid injection to reduce discharge temperature.

The phrase "Global Warming Potential" (hereinafter "GWP") was developed to allow comparisons of the global warming impact of different gases. Specifically, it is a measure of how much energy the emission of one ton of a gas will absorb over a given period of time, relative to the emission of one ton of carbon dioxide. The larger the GWP, the more that a given gas warms the Earth compared to CO2 over that time period. The time period usually used for GWP is 100 years. GWP provides a common measure, which allows analysts to add up emission estimates of different gases. See www.epa.gov.

The term "mass flow rate" is the mass of refrigerant passing through a conduit per unit of time.

The term "Occupational Exposure Limit (OEL)" is determined in accordance with ASHRAE Standard 34-2016 Designation and Safety Classification of Refrigerants.

As the term is used herein, "replacement for" with respect to a particular heat transfer composition or refrigerant of the present invention as a "replacement for" a particular prior refrigerant means the use of the indicated composition of the present invention in a heat transfer system that heretofore had been commonly used with that prior refrigerant. By way of example, when a refrigerant or heat transfer composition of the present invention is used in a heat transfer system that has heretofore been designed for and/or commonly used with R410A, such as residential air conditioning and commercial air conditioning (including roof top systems, variable refrigerant flow (VRF) systems and chiller systems) then the present refrigerant is a replacement for R410A is such systems. The phrase "thermodynamic glide" applies to zeotropic refrigerant mixtures that have varying temperatures during phase change processes in the evaporator or condenser at constant pressure.

As the term is used herein, "TAN value" refers to the total acid number as determined in accordance with ASHRAE Standard 97—"Sealed Glass Tube Method to Test the Chemical Stability of Materials for Use within Refrigerant Systems" to simulate long-term stability of the heat transfer compositions by accelerated aging.

Heat Transfer Compositions

Applicants have found that the heat transfer compositions of the present invention, including each of Heat Transfer Compositions 1-17 as described herein, are capable of providing exceptionally advantageous properties and in particular stability in use and non-flammability, especially with the use of the heat transfer compositions as a replacement for R-410A and especially in prior 410A residential air conditioning systems, and prior R-410A commercial air conditioning systems (including prior R-410A roof top systems, prior R-410A variable refrigerant flow (VRF) systems and prior R-410A chiller systems).

As used herein, the reference Heat Transfer Compositions 1-17 refers to each of Heat Transfer Compositions 1 through 17, including Heat Transfer Compositions 8A and 8B.

A particular advantage of the refrigerants included in the heat transfer compositions of the present invention is that they are non-flammable when tested in accordance with the Non-Flammability Test, and as mentioned above there has been a desire in the art to provide refrigerants and heat transfer compositions which can be used as a replacement for R-410A in various systems, and which has excellent heat transfer properties, low environmental impact (including particularly low GWP and near zero ODP), excellent chemical stability, low or no toxicity, and/or lubricant compatibility and which maintains non-flammability in use. This desirable advantage can be achieved by refrigerants and heat transfer compositions of the present invention.

Preferably, the heat transfer compositions of the present invention, including each of Heat Transfer Compositions 1-17, include refrigerant in an amount of greater than 40% by weight of the heat transfer composition.

Preferably, the heat transfer compositions of the present invention, including each of Heat Transfer Compositions 1-17, include refrigerant in an amount of greater than 50% by weight, or greater than 70% by weight, or greater than 80% by weight, or greater than 90% of the heat transfer composition.

Preferably, the heat transfer compositions of the present invention, including each of Heat Transfer Compositions 1-17, consist essentially of the refrigerant, the lubricant and stabilizer.

The heat transfer compositions of the invention may include other components for the purpose of enhancing or providing certain functionality to the compositions, preferably without negating the enhanced stability provided in accordance with present invention. Such other components or additives may include, dyes, solubilizing agents, compatibilizers, auxiliary stabilizers, antioxidants, corrosion inhibitors, extreme pressure additives and anti-wear additives.

Stabilizers:
Alkylated Naphthalenes

Applicants have surprisingly and unexpectedly found that alkylated napthalenes are highly effective as stabilizers for the heat transfer compositions of the present invention. As used herein, the term "alkylated naphthalene" refers to compounds having the following structure:

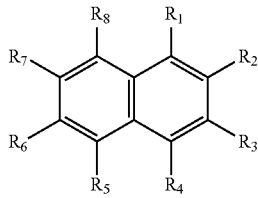

where each $R_1$-$R_8$ is independently selected from linear alkyl group, a branched alkyl group and hydrogen. The particular length of the alkyl chains and the mixtures or branched and straight chains and hydrogens can vary within the scope of the present invention, and it will be appreciated and understood by those skilled in the art that such variation is reflecteded the physical properties of the alkylated naphthalene, including in particular the viscosity of the alkylated compound, and producers of such materials frequently define the materials by reference to one or more of such properties as an alternative the specification of the particular R groups.

Applicants have found unexpected, surprising and advantageous results are associated the use of alkylated naphthalene as a stabilizer according to the present invention having the following properties, and alkylated naphthalene compounds having the indicated properties are referred to for convenience herein as Alkylated Napthalene 1 (or AN1)—Alylated Napthalene 5 (or AN5) as indicated respectively in rows 1-5 in the Table below:

TABLE 1

ALKYLATED NAPHTHALENE

| Property | Alkylated Napthalene 1 AN1 | Alkylated Napthalene 2 AN2 | Alkylated Napthalene 3 AN3 | Alkylated Napthalene 4 AN4 | Alkylated Napthalene 5 AN5 |
|---|---|---|---|---|---|
| Viscosity @ 40° C. (ASTM D445), cSt | 20-200 | 20-100 | 20-50 | 30-40 | about 36 |
| Viscosity @100° C. (ASTM D445), cSt | 3-20 | 3-10 | 3-8 | 5-7 | about 5.6 |
| Pour Point (ASTM D97), ° C. | −50 to −20 | −45 to −25 | −40 to −30 | −35 to −30 | about −33 |

As used herein in connection with viscosity at 40° C. measured according to ASTM D445, the term "about" means+/−4 cSt.

As used herein in connection with viscosity at 100° C. measured according to ASTM D445, the term "about" means+/−0.4 cSt.

As used herein in connection with pour point as measured according to ASTM D97, the term "about" means+/−5° C.

Applicants have also found that unexpected, surprising and advantageous results are associated the use of alkylated naphthalene as a stabilizer according to the present invention having the following properties, and alkylated naphthalene compounds having the indicated properties are referred to for convenience herein as Alkylated Napthalene 6 (or AN6)—Alkylated Napthalene 10 (or AN10) as indicated respectively in rows 6-10 in the Table below:

TABLE 2

ALKYLATED NAPHTHALENE

| Property | AN6 | AN7 | AN 8 | AN 9 | AN10 |
|---|---|---|---|---|---|
| Viscosity @ 40° C. (ASTM D445), cSt | 20-200 | 20-100 | 20-50 | 30-40 | about 36 |
| Viscosity @100° C. (ASTM D445), cSt | 3-20 | 3-10 | 3-8 | 5-7 | about 5.6 |
| Aniline Point (ASTM D611), ° C. | 40-110 | 50-90 | 50-80 | 60-70 | about 36 |
| Noack Volatility CEC L40 (ASTM D6375), wt % | 1-50 | 5-30 | 5-15 | 10-15 | about 12 |
| Pour Point (ASTM D97), ° C. | −50 to −20 | −45 to −25 | −40 to −30 | −35 to −30 | about −33 |
| Flash Point (ASTM D92)), ° C. | 200-300 | 200-270 | 220-250 | 230-240 | about 236 |

Examples of alkylated napthalyenes within the meaning of Alkylated Naphthalene 1 (AN1) and Alkylated Naphthalene 6 (AN6) include those sold by King Industries under the trade designations NA-LUBE KR-007A; KR-008; KR-009; KR-015; KR-019; KR-005FG; KR-015FG; and KR-029FG.

Examples of alkylated napthalyenes within the meaning of Alkylated Naphthalene 2 (AN2) and Alkylated Naphthalene 7 (AN7) include those sold by King Industries under the trade designations NA-LUBE KR-007A; KR-008; KR-009; and KR-005FG.

An example of an alkylated napthylene that is within the meaning of Alkylated Naphthalene 5 (AN5) nd Alkylated Naphthalene 10 (AN10) includes the product sold by King Industries under the trade designation NA-LUBE KR-008.

The present invention includes heat transfer compositions, including each of Heat Transfer Compositions 1-17 hereof, wherein the alkylated naphthalene is selected from AN1 or AN2 or AN3 or AN4 or AN5 or AN6 or AN7 or AN8 or AN9 or AN10.

The present invention also includes heat transfer compositions, including each of Heat Transfer Compositions 1-17 hereof, wherein the alkylated naphthalene is AN1.

The present invention also includes heat transfer compositions, including each of Heat Transfer Compositions 1-17 hereof, wherein the alkylated naphthalene is AN5.

The present invention also includes heat transfer compositions, including each of Heat Transfer Compositions 1-17 hereof, wherein the alkylated naphthalene is AN10.

Acid Depleting Moieties (ADM)

Those skilled in the art will be able to determine, without undo experimentation, a variety of ADMs that are useful in accordance with the present invention, and all such ADMs are within the scope hereof.

Epoxides

Applicants have found that epoxides, and particularly alkylated epoxides, are effective at producing the enhanced stability discussed herein when used in combination with alkylated naphthalene stabilizers, and while applicants are not necessarily bound by theory it is believed that this synergistic enhancement stems at least in part due to its effective functioning as an ADM in the heat transfer compositions of the present invention.

In preferred embodiments the epoxide is selected from the group consisting of epoxides that undergo ring-opening reactions with acids, thereby depleting the system of acid while not otherwise deleteriously affecting the system.

Useful epoxides include aromatic epoxides, alkyl epoxides, and alkyenyl epoxides.

Preferred epoxides include epoxides of the following Formula I:

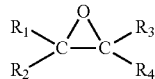

where at least one of said $R_1$-$R_4$ is selected from a two to fifteen carbon (C2-C15) acyclic group, a C2-C15 aliphatic group and a C2-C15 ethers. An epoxide according to Formula 1 is sometimes referred to herein for convenience as ADM1.

In a preferred embodiment, at least one of R1-R4 of Formula I is an ether having the following structure:

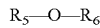

where each of R5 and R6 is independently a C1-C14 straight chain or branched chain, preferably unsubstituted, alkyl group. An epoxide according to the paragraph is sometimes referred to herein for convenience as ADM2.

In a preferred embodiment, one of $R_1$-$R_4$ of Formula I is an ether having the following structure:

where each of $R_5$ and $R_6$ is independently a C1-C14 straight chain or branched chain, preferably unsubstituted, alkyl group, and the remaining three of $R_1$-$R_4$ are H. An epoxide according to the paragraph is sometimes referred to herein for convenience as ADM3.

In preferred embodiments the epoxide comprises, consists essentially of or consists of 2-ethylhexyl glycidyl ether. An epoxide according to this paragraph is sometimes referred to herein for convenience as ADM4.

The present invention includes heat transfer compositions, including each of Heat Transfer Compositions 1-8 and 9-17 hereof, wherein the alkylated naphthalene is AN1 and further comprising ADM1.

The present invention includes heat transfer compositions, including each of Heat Transfer Compositions 1-8 and 9-17, wherein the alkylated naphthalene is AN1 and further comprising ADM2.

The present invention includes heat transfer compositions, including each of Heat Transfer Compositions 1-8 and 9-17, wherein the alkylated naphthalene is AN1 and further comprising ADM3.

The present invention includes heat transfer compositions, including each of Heat Transfer Compositions 1-8 and 9-17, wherein the alkylated naphthalene is AN1 and further comprising ADM4.

The present invention includes heat transfer compositions, including each of Heat Transfer Compositions 1-8 and 9-17, wherein the alkylated naphthalene is AN5 and further comprising ADM1.

The present invention includes heat transfer compositions, including each of Heat Transfer Compositions 1-8 and 9-17, wherein the alkylated naphthalene is AN5 and further comprising ADM2.

The present invention includes heat transfer compositions, including each of Heat Transfer Compositions 1-8 and 9-17, wherein the alkylated naphthalene is AN5 and further comprising ADM3.

The present invention includes heat transfer compositions, including each of Heat Transfer Compositions 1-8 and 9-17, wherein the alkylated naphthalene is AN5 and further comprising ADM4.

The present invention includes heat transfer compositions, including each of Heat Transfer Compositions 1-8 and 9-17, wherein the alkylated naphthalene is AN10 and further comprising ADM1.

The present invention includes heat transfer compositions, including each of Heat Transfer Compositions 1-8 and 9-17, wherein the alkylated naphthalene is AN10 and further comprising ADM2.

The present invention includes heat transfer compositions, including each of Heat Transfer Compositions 1-8 and 9-17, wherein the alkylated naphthalene is AN10 and further comprising ADM3.

The present invention includes heat transfer compositions, including each of Heat Transfer Compositions 1-8 and 9-17, wherein the alkylated naphthalene is AN10 and further comprising ADM4.

The present invention includes heat transfer compositions, including each of Heat Transfer Compositions 1-8 and 9-17, wherein the alkylated naphthalene is AN2 or AN3 or AN4 or AN6 or AN7 or AN8 or AN9 and further comprising ADM1.

The present invention includes heat transfer compositions, including each of Heat Transfer Compositions 1-8 and 9-17, wherein the alkylated naphthalene is AN2 or AN3 or AN4 or AN6 or AN7 or AN8 or AN9 and further comprising ADM2.

The present invention includes heat transfer compositions, including each of Heat Transfer Compositions 1-8 and 9-17, wherein the alkylated naphthalene is AN2 or AN3 or AN4 or AN6 or AN7 or AN8 or AN9 and further comprising ADM3.

The present invention includes heat transfer compositions, including each of Heat Transfer Compositions 1-8 and 9-17, wherein the alkylated naphthalene is AN2 or AN3 or AN4 or AN6 or AN7 or AN8 or AN9 and further comprising ADM4.

When the ADM is present in the Heat Transfer Compositions of the present invention, including each of Heat Transfer Compositions 1-8 and 9-17, the alkylated naphthalene is preferably is present in an amount of from 0.01% to about 10%, or from about 1.5% to about 4.5%, or from about 2.5% to about 3.5%, where amounts are in percent by weight based on the amount of alkylated naphthalene plus refrigerant in the system.

When the ADM is present in the Heat Transfer Compositions of the present invention, including each of Heat Transfer Compositions 1-8 and 9-17, the alkylated naphthalene is preferably present in an amount of from 0.1% to about 20%, or from 1.5% to about 10%, or from 1.5% to about 8%, where amounts are in percent by weight based on the amount of alkylated naphthalene plus lubricant in the system.

Carbodiimides

The ADM can include carbodiimides. In preferred embodiments the carbodiimides include compounds having the following structure:

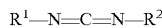

Other Stabilizers

It is contemplated that stabilizers other than the alkylated naphthalenes and ADM may be included in the heat transfer compositions of the present invention, including each of Heat Transfer Compositions 1-17. Examples of such other stabilizers are described hereinafter.

Phenol-Based Compounds

In preferred embodiments, the stabilizer further includes a phenol based compound.

The phenol-based compound can be one or more compounds selected from 4,4'-methylenebis(2,6-di-tert-butylphenol); 4,4'-bis(2,6-di-tert-butylphenol); 2,2- or 4,4-biphenyldiols, including 4,4'-bis(2-methyl-6-tert-butylphenol); derivatives of 2,2- or 4,4-biphenyldiols; 2,2'-methylenebis(4-ethyl-6-tertbutylphenol); 2,2'-methylenebis (4-methyl-6-tert-butylphenol); 4,4-butylidenebis(3-methyl-6-tert-butylphenol); 4,4-isopropylidenebis(2,6-di-tert-butylphenol); 2,2'-methylenebis(4-methyl-6-nonylphenol); 2,2'-isobutylidenebis(4,6-dimethylphenol); 2,2'-methylenebis(4-methyl-6-cyclohexylphenol); 2,6-di-tert-butyl-4-methylphenol (BHT); 2,6-di-tert-butyl-4-ethylphenol: 2,4-dimethyl-6-tert-butylphenol; 2,6-di-tert-alpha-dimethylamino-p-cresol; 2,6-di-tert-butyl-4(N,N'-dimethylaminomethylphenol); 4,4'-thiobis(2-methyl-6-tert-butylphenol); 4,4'-thiobis(3-methyl-6-tert-butylphenol); 2,2'-thiobis(4-methyl-6-tert-butylphenol); bis(3-methyl-4-hydroxy-5-tert-butylbenzyl) sulfide; bis (3,5-di-tert-butyl-4-hydroxybenzyl)sulfide, tocopherol, hydroquinone, 2,2'6,6'-tetra-tert-butyl-4,4'-methylenediphenol and t-butyl hydroquinone, and preferably BHT.

The phenol compounds, and in particular BHT, can be provided in the heat transfer composition in an amount of greater than 0 and preferably from 0.0001% by weight to about 5% by weight, preferably 0.001% by weight to about 2.5% by weight, and more preferably from 0.01% to about 1% by weight. In each case, percentage by weight refers to the weight of the heat transfer composition.

The phenol compounds, and in particular BHT, can be provided in the heat transfer composition in an amount of greater than 0 and preferably from 0.0001% by weight to about 5% by weight, preferably 0.001% by weight to about 2.5% by weight, and more preferably from 0.01% to about 1% by weight. In each case, percentage by weight refers to the weight based on the weight of the lubricant in the heat transfer composition.

The present invention also includes stabilizer comprising from about 40% to about 95% by weight of alkylated naphthalenes, including each of AN1-AN10, and from 0.1 to about 10% by weight of BHT, based on the weight of the all the stabilizer components in the composition. The stabilizer according to this paragraph is sometimes referred to herein for convenience as Stabilizer 6.

The present invention also includes stabilizer comprising from about 40% to about 95% by weight of alkylated naphthalenes, including each of AN1-AN10, from 5% to about 30% by weight of ADM, including each of ADM1-ADM4, and from 0.1 to about 10% by weight of BHT, based on the weight of the all the stabilizer components in the composition. The stabilizer according to this paragraph is sometimes referred to herein for convenience as Stabilizer 7.

The present invention includes heat transfer compositions, including each of Heat Transfer Compositions 1-17 hereof, wherein the heat transfer composition comprises Stabilizer 6.

The present invention includes heat transfer compositions, including each of Heat Transfer Compositions 1-8 and 9-26 hereof, wherein the heat transfer compositions comprises Stabilizer 7.

The present invention includes heat transfer compositions, including each of Heat Transfer Compositions 1-17 hereof, comprising AN1 and BHT.

The present invention includes heat transfer compositions, including each of Heat Transfer Compositions 1-17 hereof, comprising AN5 and BHT.

The present invention includes heat transfer compositions, including each of Heat Transfer Compositions 1-17 hereof, comprising AN10 and BHT.

The present invention includes heat transfer compositions, including each of Heat Transfer Compositions 1-8 and 9-17 hereof, comprising of AN5, ADM4 and BHT.

The present invention includes heat transfer compositions, including each of Heat Transfer Compositions 1-8 and 9-17 hereof, comprising AN10, ADM4 and BHT.

Diene-Based Compounds

The diene-based compounds include C3 to C15 dienes and to compounds formed by reaction of any two or more C3 to C4 dienes. Preferably, the diene based compounds are selected from the group consisting of allyl ethers, propadiene, butadiene, isoprene, and terpenes. The diene-based compounds are preferably terpenes, which include but are not limited to terebene, retinal, geraniol, terpinene, delta-3 carene, terpinolene, phellandrene, fenchene, myrcene, farnesene, pinene, nerol, citral, camphor, menthol, limonene, nerolidol, phytol, carnosic acid, and vitamin A1. Preferably, the stabilizer is farnesene. Preferred terpene stabilizers are disclosed in U.S. Provisional Patent Application No. 60/638,003 filed on Dec. 12, 2004, published as US 2006/0167044A1, which is incorporated herein by reference.

In addition, the diene based compounds can be provided in the heat transfer composition in an amount greater than 0 and preferably from 0.0001% by weight to about 5% by weight, preferably 0.001% by weight to about 2.5% by weight, and more preferably from 0.01% to about 1% by weight. In each case, percentage by weight refers to the weight of the heat transfer composition.

Phosphorus-Based Compounds

The phosphorus compound can be a phosphite or a phosphate compound. For the purposes of this invention, the phosphite compound can be a diaryl, dialkyl, triaryl and/or trialkyl phosphite, and/or a mixed aryl/alkyl di- or tri-substituted phosphite, in particular one or more compounds selected from hindered phosphites, tris-(di-tert-butylphenyl) phosphite, di-n-octyl phophite, iso-octyl diphenyl phosphite, iso-decyl diphenyl phosphite, tri-iso-decyl phosphate, triphenyl phosphite and diphenyl phosphite, particularly diphenyl phosphite. The phosphate compounds can be a triaryl phosphate, trialkyl phosphate, alkyl mono acid phosphate, aryl diacid phosphate, amine phosphate, preferably triaryl phosphate and/or a trialkyl phosphate, particularly tri-n-butyl phosphate.

The phosphorus compounds can be provided in the heat transfer composition in an amount of greater than 0 and preferably from 0.0001% by weight to about 5% by weight, preferably 0.001% by weight to about 2.5% by weight, and more preferably from 0.01% to about 1% by weight. In each case, by weight refers to weight of the heat transfer composition.

Nitrogen Compounds

When the stabilizer is a nitrogen compound, the stabilizer may comprise an amine based compound such as one or more secondary or tertiary amines selected from diphenylamine, p-phenylenediamine, triethylamine, tributylamine, diisopropylamine, triisopropylamine and triisobutylamine. The amine based compound can be an amine antioxidant such as a substituted piperidine compound, i.e. a derivative of an alkyl substituted piperidyl, piperidinyl, piperazinone, or alkyoxypiperidinyl, particularly one or more amine antioxidants selected from 2,2,6,6-tetramethyl-4-piperidone, 2,2,6,6-tetramethyl-4-piperidinol; bis-(1,2,2,6,6-pentamethylpiperidyl)sebacate; di(2,2,6,6-tetramethyl-4-piperidyl)sebacate, poly(N-hydroxyethyl-2,2,6,6-tetramethyl-4-hydroxy-piperidyl succinate; alkylated paraphenylenediamines such as N-phenyl-N'-(1,3-dimethyl-butyl)-p-phenylenediamine or N,N'-di-sec-butyl-p-phenylenediamine and hydroxylamines such as tallow amines, methyl bis tallow amine and bis tallow amine, or phenol-alpha-napththylamine or Tinuvin®765 (Ciba), BLS®1944 (Mayzo Inc) and BLS®1770 (Mayzo Inc). For the purposes of this invention, the amine based compound also can be an alkyldiphenyl amine such as bis (nonylphenyl amine), dialkylamine such as (N-(1-methylethyl)-2-propylamine, or. one or more of phenyl-alpha-naphthyl amine (PANA), alkyl-phenyl-alpha-naphthyl-amine (APANA), and bis (nonylphenyl) amine. Preferably the amine based compound is one or more of phenyl-alpha-naphthyl amine (PANA), alkyl-phenyl-alpha-naphthyl-amine (APANA) and bis (nonylphenyl) amine, and more preferably phenyl-alpha-naphthyl amine (PANA).

Alternatively, or in addition to the nitrogen compounds identified above, one or more compounds selected from dinitrobenzene, nitrobenzene, nitromethane, nitrosobenzene, and TEMPO [(2,2,6,6-tetramethylpiperidin-1-yl)oxyl] may be used as the stabilizer. The nitrogen compounds can be provided in the heat transfer composition in an amount of greater than 0 and from 0.0001% by weight to about 5% by weight, preferably 0.001% by weight to about 2.5% by weight, and more preferably from 0.01% to about 1% by weight. In each case, percentage by weight refers to the weight of the heat transfer composition.

Isobutylene

Isobutylene may also be used as a stabilizer according to the present invention.

Additional Stabilizer Compositions

The present invention also provides stabilizer comprising alkylated naphthalene, including each of AN1-AN10 and an ADM, including each of ADM1-ADM4, and a phenol. A stabilizer according to this paragraph is sometimes referred to herein for convenience as Stabilizer 8.

The present invention also provides a stabilizer consisting essentially of alkylated naphthalene, including each of AN1-AN10 and an ADM, including each of ADM1-ADM4, and a phosphate. A stabilizer according to this paragraph is sometimes referred to herein for convenience as Stabilizer 9.

The present invention also provides stabilizer comprising alkylated naphthalene, including each of AN1-AN10 and an ADM, including each of ADM1-ADM4 and a combination of a phosphate and a phenol. A stabilizer according to this paragraph is sometimes referred to herein for convenience as Stabilizer 10.

The present invention also provides a stabilizer comprising alkylated naphthalene, including each of AN1-AN10, in an amount of from about 40% by weight to about 95% by weight, an ADM, including each of ADM1-ADM4, in an amount of from about 0.5% by weight to about 25% by weight, and an additional stabilizer selected from a phosphate, a phenol and combinations of these in an amount of from about 0.1% by weight to about 50% by weight, wherein said weight percentages are based on the total weight of the stabilizer. A stabilizer according to this paragraph is sometimes referred to herein for convenience as Stabilizer 11.

The present invention also provides a stabilizer comprising alkylated naphthalene, including each of AN1-AN10, in an amount of from about 70% by weight to about 95% by weight, an ADM, including each of ADM1-ADM4, in an amount of from about 0.5% by weight to about 15% by weight, and an additional stabilizer selected from a phosphate, a phenol and combinations of these in an amount of from about 0.1% by weight to about 25% by weight, wherein said weight percentages are based on the total weight of the stabilizer. A stabilizer according to this paragraph is sometimes referred to herein for convenience as Stabilizer 12.

The present invention also provides a stabilizer consisting essentially of alkylated naphthalene, including each of AN1-AN10 and an ADM, including each of ADM1-ADM4 and BHT. A stabilizer according to this paragraph is sometimes referred to herein for convenience as Stabilizer 13.

The present invention also provides a stabilizer consisting of alkylated naphthalene, including each of AN1-AN10 and an ADM, including each of ADM1-ADM4 and BHTI. A stabilizer according to this paragraph is sometimes referred to herein for convenience as Stabilizer 14.

The present invention also provides a stabilizer consisting essentially of alkylated naphthalene, including each of AN1-AN10 and an ADM, including each of ADM1-ADM4, BHT and a phosphate. A stabilizer according to this paragraph is sometimes referred to herein for convenience as Stabilizer 15.

The present invention also provides a stabilizer consisting of alkylated naphthalene, including each of AN1-AN10 and an ADM, including each of ADM1-ADM4, BHT and a phosphate. A stabilizer according to this paragraph is sometimes referred to herein for convenience as Stabilizer 16.

The present invention also provides a stabilizer comprising alkylated naphthalene, including each of AN1-AN10, in an amount of from about 40% by weight to about 95% by weight, an ADM, including each of ADM1-ADM4, in an amount of from about 0.5% by weight to about 10% by weight, and BHT, in an amount of from about 0.1% by weight to about 50% by weight, wherein said weight percentages are based on the total weight of the stabilizer. A stabilizer according to this paragraph is sometimes referred to herein for convenience as Stabilizer 17.

The present invention also provides a stabilizer comprising alkylated naphthalene, including each of AN1-AN10, in an amount of from about 70% by weight to about 95% by weight, an ADM, including each of ADM1-ADM4, in an amount of from about 0.5% by weight to about 10% by weight, and BHT, in an amount of from about 0.1% by weight to about 25% by weight, wherein said weight percentages are based on the total weight of the stabilizer. A stabilizer according to this paragraph is sometimes referred to herein for convenience as Stabilizer 18.

The present invention also provides a stabilizer comprising alkylated naphthalene, including each of AN1-AN10, in an amount of from about 40% by weight to about 95% by weight, an ADM, including each of ADM1-ADM4, in an amount of from about 5% by weight to about 25% by weight, and a third stabilizer compound selected from BHT, a phosphate and combinations of these in an amount of from 1% by weight to about 55% by weight, wherein said weight percentages are based on the total weight of the stabilizer. A stabilizer according to this paragraph is sometimes referred to herein for convenience as Stabilizer 19.

The present invention also provides a stabilizer comprising alkylated naphthalene, including each of AN1-AN10, in an amount of from about 40% by weight to about 95% by weight, an ADM, including each of ADM1-ADM4, in an amount of from about 5% by weight to about 25% by weight, and BHT, in an amount of from about 0.1% by weight to about 5% by weight, wherein said weight percentages are based on the total weight of the stabilizer. A stabilizer according to this paragraph is sometimes referred to herein for convenience as Stabilizer 20.

The stabilizers of the present invention, including each of Stabilizers 1-20, can be used in any of the heat transfer compositions of the present invention, including any of Heat Transfer compositions 1-8 and 9-17.

The stabilizers of the present invention, including each of Stabilizers 1-6, can also be used in any of Heat Transfer compositions 8A and 8B.

Lubricants

In general, the heat transfer composition of the present invention, including each of Heat Transfer Compositions 1-17, comprises a POE lubricant and/or a PVE lubricant wherein the lubricant is preferably present in amounts preferably of from about 0.1% by weight to about 5%, or from 0.1% by weight to about 1% by weight, or from 0.1% by weight to about 0.5% by weight, based on the weight of the heat transfer composition.

POE Lubricants

The POE lubricant of the present invention includes in preferred embodiments a neopentyl POE lubricant. As used herein, the term neopentyl POE lubricant refers to polyol esters (POEs) derived from a reaction between a neopentyl polyol (preferably pentaerythritol, trimethylolpropane, or neopentyl glycol, and in embodiments where higher viscosities are preferred, dipentaerythritol) and a linear or branched carboxylic acid.

Commercially available POEs include neopentyl glycol dipelargonate which is available as Emery 2917 (registered trademark) and Hatcol 2370 (registered trademark) and pentaerythritol derivatives including those sold under the trade designations Emkarate RL32-3MAF and Emkarate RL68H by CPI Fluid Engineering. Emkarate RL32-3MAF and Emkarate RL68H are preferred neopently POE lubricants having the properties identified below:

| Property | RL32-3MAF | RL68H |
|---|---|---|
| Viscosity @ 40° C. (ASTM D445), cSt | about 31 | about 67 |
| Viscosity @100° C. (ASTM D445), cSt | about 5.6 | about 9.4 |
| Pour Point (ASTM D97), ° C. | about −40 | about −40 |

Other useful esters include phosphate esters, di-basic acid esters and fluoro esters.

A lubricant consisting essentially of a POE having a viscosity at 40° C. measured in accordance with ASTM D445 of from about 30 cSt to about 70 cSt and a viscosity Measured @ 100° C. in accordance with ASTM D445 of from about 5 cSt to about 10 cSt is referred to herein as Lubricant 1.

A lubricant consisting essentially of a neopentyl POE having a viscosity at 40° C. measured in accordance with ASTM D445 of from about 30 cSt to about 70 cSt is referred to for convenience as Lubricant 2.

In preferred embodiments, the present Heat Transfer Compositions, including each of Heat Transfer Compositions 1-17, comprise a POE lubricant.

In preferred embodiments, the present Heat Transfer Compositions, including each of Heat Transfer Compositions 1-17, comprise lubricant consisting essentially of a POE lubricant.

In preferred embodiments, the present Heat Transfer Compositions, including each of Heat Transfer Compositions 1-17, comprise lubricant consisting of a POE lubricant.

The present invention comprises heat transfer compositions of the present invention, including each Heat Transfer Compositions 1-17, wherein the lubricant is Lubricant 1 and/or Lubricant 2.

PVE Lubricants

The lubricant of the present invention can include PVE lubricants generally. In preferred embodiments the PVE lubricant is as PVE according to Formula II below:

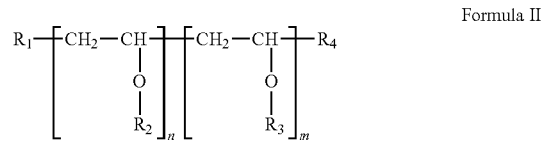

Formula II where $R_2$ and $R_3$ are each independently C1-C10 hydrocarbons, preferably C2-C8 hydrocarbons, and $R_1$ and $R_4$ are each independently alkyl, alkylene glycol, or polyoxyalkylene glycol units and n and m are selected preferably according to the needs of those skilled in the art to obtain a lubricant with the desired properties, and preferable n and m are selected to obtain a lubricant with a viscosity at 40° C. measured in accordance with ASTM D445 of from about 30 to about 70 cSt. A PVE lubricant according to the description immediately above is referred to for convenience as Lubricant 3. Commercially available polyvinyl ethers include those lubricants sold under the trade designations FVC32D and FVC68D, from Idemitsu.

In preferred embodiments, the present Heat Transfer Compositions, including each of Heat Transfer Compositions 1-17, comprise a PVE lubricant.

In preferred embodiments, the present Heat Transfer Compositions, including each of Heat Transfer Compositions 1-17, comprise lubricant consist essentially of a PVE lubricant.

In preferred embodiments, the present Heat Transfer Compositions, including each of Heat Transfer Compositions 1-17, comprise lubricant consisting of a PVE lubricant.

In preferred embodiments, the PVE in the present Heat Transfer Compositions, including each of Heat Transfer Compositions 1-17, is a PVE according to Formula II.

The present invention comprises heat transfer compositions of the present invention, including each Heat Transfer Compositions 1-17, wherein the lubricant is Lubricant 1 and/or Lubricant 2 and/or Lubricant 3.

Stabilized Lubricants

The present invention also provides stabilized lubricants comprising: (a) POE lubricant; and (b) a stabilizer of the present invention, including each of Stabilizers 1-20. The stabilized lubricant according to this paragraph is sometimes referred to herein for convenience as Stabilized Lubricant 1.

The present invention also provides stabilized lubricants comprising: (a) neo pentyl POE lubricant; and (b) a stabilizer of the present invention, including each of Stabilizers 1-20. The stabilized lubricant according to this paragraph is sometimes referred to herein for convenience as Stabilized Lubricant 2.

The present invention also provides stabilized lubricants comprising: (a) Lubricant 1; and (b) a stabilizer of the present invention, including each of Stabilizers 1-20. The stabilized lubricant according to this paragraph is sometimes referred to herein for convenience as Stabilized Lubricant 3.

The present invention also provides stabilized lubricants comprising: (a) Lubricant 2; and (b) a stabilizer of the present invention, including each of Stabilizers 1-20. The stabilized lubricant according to this paragraph is sometimes referred to herein for convenience as Stabilized Lubricant 4.

The present invention also includes stabilized lubricants comprising: (a) POE lubricant and/or polyvinyl ether (PVE) lubricant; and (b) Stabilizer 1. The stabilized lubricant according to this paragraph is sometimes referred to herein for convenience as Stabilized Lubricant 5.

The present invention also includes stabilized lubricants comprising: (a) POE lubricant and/or polyvinyl ether (PVE) lubricant; and (b) Stabilizer 2. The stabilized lubricant according to this paragraph is sometimes referred to herein for convenience as Stabilized Lubricant 6.

The present invention also includes stabilized lubricants comprising: (a) POE lubricant and/or polyvinyl ether (PVE) lubricant; and (b) Stabilizer 3. The stabilized lubricant according to this paragraph is sometimes referred to herein for convenience as Stabilized Lubricant 7.

The present invention also includes stabilized lubricants comprising: (a) POE lubricant and/or polyvinyl ether (PVE) lubricant; and (b) Stabilizer 4. The stabilized lubricant according to this paragraph is sometimes referred to herein for convenience as Stabilized Lubricant 8.

The present invention also includes stabilized lubricants comprising: (a) POE lubricant and/or polyvinyl ether (PVE) lubricant; and (b) Stabilizer 5. The stabilized lubricant according to this paragraph is sometimes referred to herein for convenience as Stabilized Lubricant 9.

The present invention also includes stabilized lubricants comprising: (a) POE lubricant; and (b) from 1% to less than 10% by weight of alkylated naphthalene based on the weight of the lubricant and alkylated naphthalene. The stabilized lubricant according to this paragraph is sometimes referred to herein for convenience as Stabilized Lubricant 10.

The present invention also includes stabilized lubricants comprising: (a) POE lubricant; and (b) from 1% to 8% by weight of alkylated naphthalene based on the weight of the lubricant and alkylated naphthalene. The stabilized lubricant according to this paragraph is sometimes referred to herein for convenience as Stabilized Lubricant 11.

The present invention also includes stabilized lubricants comprising: (a) POE lubricant; and (b) from 1.5% to 8% by weight of alkylated naphthalene based on the weight of the lubricant and alkylated naphthalene. The stabilized lubricant according to this paragraph is sometimes referred to herein for convenience as Stabilized Lubricant 12.

The present invention also includes stabilized lubricants comprising: (a) POE lubricant; and (b) from 1.5% to 6% by weight of alkylated naphthalene based on the weight of the lubricant and alkylated naphthalene. The stabilized lubricant according to this paragraph is sometimes referred to herein for convenience as Stabilized Lubricant 13.

The present invention includes heat transfer compositions of the invention, including each of Heat Transfer Compositions 1-17, in which the lubricant and stabilizer are a stabilized lubricant of the present invention, including each of Stabilized Lubricants 1-13.

Methods, Uses and Systems

The heat transfer compositions disclosed herein are provided for use in heat transfer applications, including air conditioning applications, with highly preferred air conditioning applications including residential air conditioning, commercial air conditioning applications (such as roof top applications, VRF applications and chillers).

The present invention also includes methods for providing heat transfer including methods of air conditioning, with highly preferred air conditioning methods including providing residential air conditioning, providing commercial air conditioning (such as methods of providing roof top air conditioning, methods of providing VRF air conditioning and methods of providing air conditioning using chillers.

The present invention also includes heat transfer systems, including air conditioning systems, with highly preferred air conditioning systems including residential air conditioning, commercial air conditioning systems (such as roof top air conditioning systems, VRF air conditioning systems and air conditioning chiller systems).

The invention also provides uses of the heat transfer compositions, methods using the heat transfer compositions and systems containing the heat transfer compostions in connection with refrigeration, heat pumps and chillers (including portable water chillers and central water chillers).

Any reference to the heat transfer composition of the invention refers to each and any of the heat transfer compositions as described herein. Thus, for the following discussion of the uses, methods, systems or applications of the composition of the invention, the heat transfer composition may comprise or consist essentially of any of Heat Transfer Compositions 1-17.

For heat transfer systems of the present invention that include a compressor and lubricant for the compressor in the system, the system can comprises a loading of refrigerant and lubricant such that the lubricant loading in the system is from about 5% to 60% by weight, or from about 10% to about 60% by weight, or from about 20% to about 50% by weight, or from about 20% to about 40% by weight, or from about 20% to about 30% by weight, or from about 30% to about 50% by weight, or from about 30% to about 40% by weight. As used herein, the term "lubricant loading" refers to the total weight of lubricant contained in the system as a percentage of total of lubricant and refrigerant contained in the system. Such systems may also include a lubricant loading of from about 5% to about 10% by weight, or about 8% by weight of the heat transfer composition.

The heat transfer systems according to the present invention can comprise a compressor, an evaporator, a condenser and an expansion device, in fluid communication with each other, a Heat Transfer Compositions 1-17 and a sequestration material in the system, wherein said sequestration material preferably comprises: i. copper or a copper alloy, or ii. activated alumina, or iii. a zeolite molecular sieve comprising copper, silver, lead or a combination thereof, or iv. an anion exchange resin, or v. a moisture-removing material, preferably a moisture-removing molecular sieve, or via combination of two or more of the above.

The present invention also includes methods for transferring heat of the type comprising evaporating refrigerant liquid to produce a refrigerant vapor, compressing in a compressor at least a portion of the refrigerant vapor and condensing refrigerant vapor in a plurality of repeating cycles, said method comprising:

(a) providing a heat transfer composition according to the present invention, including each of Heat Transfer Compositions 1-17;

(b) optionally but preferably providing lubricant for said compressor; and (b) exposing at least a portion of said refrigerant and/or at least a portion of said lubricant to a sequestration material.

Uses, Equipment and Systems

In preferred embodiments, residential air conditioning systems and methods have refrigerant evaporating temperatures in the range of from about 0° C. to about 10° C. and the condensing temperature is in the range of about 40° C. to about 70° C.

In preferred embodiments, residential air conditioning systems and methods used in a heating mode have refrigerant evaporating temperatures in the range of from about −20° C. to about 3° C. and the condensing temperature is in the range of about 35° C. to about 50° C.

In preferred embodiments, commercial air conditioning systems and methods have refrigerant evaporating temperatures in the range of from about 0° C. to about 10° C. and the condensing temperature is in the range of about 40° C. to about 70° C.

In preferred embodiments, hydronic system systems and methods have refrigerant evaporating temperatures in the range of from about −20° C. to about 3° C. and the condensing temperature is in the range of about 50° C. to about 90° C.

In preferred embodiments, medium temperature systems and methods have refrigerant evaporating temperatures in the range of from about −12° C. to about 0° C. and the condensing temperature is in the range of about 40° C. to about 70° C.

In preferred embodiments, low temperature systems and methods have refrigerant evaporating temperatures in the range of from about −40° C. to about −12° C. and the condensing temperature is in the range of about 40° C. to about 70° C.

In preferred embodiments, rooftop air conditioning systems and methods have refrigerant evaporating temperatures in the range of from about 0° C. to about 10° C. and the condensing temperature is in the range of about 40° C. to about 70° C.

In preferred embodiments, VRF systems and methods have refrigerant evaporating temperatures in the range of from about 0° C. to about 10° C. and the condensing temperature is in the range of about 40° C. to about 70° C.

The present invention includes the use of a heat transfer composition of the invention, including each of Heat Transfer Compositions 1-17, in a residential air conditioning system.

The present invention includes the use of a heat transfer composition of the invention, including each of Heat Transfer Compositions 1-17, in a chiller system.

Examples of commonly used compressors, for the purposes of this invention include reciprocating, rotary (including rolling piston and rotary vane), scroll, screw, and centrifugal compressors. Thus, the present invention provides each and any of the refrigerants and/or heat transfer compositions as described herein for use in a heat transfer system comprising a reciprocating, rotary (including rolling piston and rotary vane), scroll, screw, or centrifugal compressor.

Examples of commonly used expansion devices, for the purposes of this invention include a capillary tube, a fixed orifice, a thermal expansion valve and an electronic expansion valve. Thus, the present invention provides each and any of the refrigerants and/or heat transfer compositions as described herein for use in a heat transfer system comprising a capillary tube, a fixed orifice, a thermal expansion valve or an electronic expansion valve.

For the purposes of this invention, the evaporator and the condenser can each be in the form a heat exchanger, preferably selected from a finned tube heat exchanger, a microchannel heat exchanger, a shell and tube, a plate heat exchanger, and a tube-in-tube heat exchanger. Thus, the present invention provides each and any of the refrigerants and/or heat transfer compositions as described herein for use in a heat transfer system wherein the evaporator and condenser together form a finned tube heat exchanger, a microchannel heat exchanger, a shell and tube, a plate heat exchanger, or a tube-in-tube heat exchanger.

The systems of the present invention thus preferably include a sequestration material in contact with at least a portion of a refrigerant and/or at least a portion of a the lubricant according to the present invention wherein the temperature of said sequestration material and/or the temperature of said refrigerant and/or the temperature of said lubricant when in said contact are at a temperature that is preferably at least about 10 C wherein the sequestration material preferably comprises a combination of: an anion exchange resin, activated alumina, a zeolite molecular sieve comprising silver, and a moisture-removing material, preferably a moisture-removing molecular sieve.

As used in this application, the term "in contact with at least a portion" is intended in its broad sense to include each of said sequestration materials and any combination of sequestration materials being in contact with the same or separate portions of the refrigerant and/or the lubricant in the system and is intended to include but not necessarily limited to embodiments in which each type or specific sequestration material is: (i) located physically together with each other type or specific material, if present; (ii) is located physically separate from each other type or specific material, if present, and (iii) combinations in which two or more materials are physically together and at least one sequestration material is physically separate from at least one other sequestration material.

The heat transfer composition of the invention can be used in heating and cooling applications.

In a particular feature of the invention, the heat transfer composition can be used in a method of cooling comprising condensing a heat transfer composition and subsequently evaporating said composition in the vicinity of an article or body to be cooled.

Thus, the invention relates to a method of cooling in a heat transfer system comprising an evaporator, a condenser and a compressor, the process comprising i) condensing a heat transfer composition as described herein; and
ii) evaporating the composition in the vicinity of body or article to be cooled; wherein the evaporator temperature of the heat transfer system is in the range of from about −40° C. to about +10° C.

Alternatively, or in addition, the heat transfer composition can be used in a method of heating comprising condensing the heat transfer composition in the vicinity of an article or body to be heated and subsequently evaporating said composition.

Thus, the invention relates to a method of heating in a heat transfer system comprising an evaporator, a condenser and a compressor, the process comprising
i) condensing a heat transfer composition as described herein, in the vicinity of a body or article to be heated, and
ii) evaporating the composition, wherein the evaporator temperature of the heat transfer system is in the range of about −30° C. to about 5° C.

The heat transfer composition of the invention is provided for use in air conditioning applications including both transport and stationary air conditioning applications. Thus, any of the heat transfer compositions described herein can be used in any one of:
- an air conditioning application including mobile air conditioning, particularly in trains and buses conditioning,
- a mobile heat pump, particularly an electric vehicle heat pump;
- a chiller, particularly a positive displacement chiller, more particularly an air cooled or water cooled direct expansion chiller, which is either modular or conventionally singularly packaged,
- a residential air conditioning system, particularly a ducted split or a ductless split air conditioning system,
- a residential heat pump,
- a residential air to water heat pump/hydronic system,
- an industrial air conditioning system
- a commercial air conditioning system, particularly a packaged rooftop unit and a variable refrigerant flow (VRF) system;
- a commercial air source, water source or ground source heat pump system.

The heat transfer composition of the invention is provided for use in a refrigeration system. The term "refrigeration system" refers to any system or apparatus or any part or portion of such a system or apparatus which employs a refrigerant to provide cooling. Thus, any of the heat transfer compositions described herein can be used in any one of:
- a low temperature refrigeration system,
- a medium temperature refrigeration system,
- a commercial refrigerator,
- a commercial freezer,
- an ice machine,
- a vending machine,
- a transport refrigeration system,
- a domestic freezer,
- a domestic refrigerator,
- an industrial freezer,
- an industrial refrigerator and
- a chiller.

Each of the heat transfer compositions described herein, including Heat Transfer Compositions 1-17, is particularly provided for use in a residential air-conditioning system (with an evaporator temperature in the range of about 0 to about 10° C., particularly about 7° C. for cooling and/or in the range of about −20 to about 3° C., particularly about 0.5° C. for heating). Alternatively, or additionally, each of the heat transfer compositions described herein, including each of Heat Transfer Compositions 1-17, is particularly provided for use in a residential air conditioning system with a reciprocating, rotary (rolling-piston or rotary vane) or scroll compressor.

Each of the heat transfer compositions described, including Heat Transfer Compositions 1-17, is particularly provided for use in an air cooled chiller (with an evaporator temperature in the range of about 0 to about 10° C., particularly about 4.5° C.), particularly an air cooled chiller with a positive displacement compressor, more particular an air cooled chiller with a reciprocating scroll compressor.

Each of the heat transfer compositions described herein, including Heat Transfer Compositions 1-17, is particularly provided for use in a residential air to water heat pump hydronic system (with an evaporator temperature in the range of about −20 to about 3° C., particularly about 0.5° C. or with an evaporator temperature in the range of about −30 to about 5° C., particularly about 0.5° C.).

Each of the heat transfer compositions described herein, including Heat Transfer Compositions 1-17, is particularly provided for use in a medium temperature refrigeration system (with an evaporator temperature in the range of about −12 to about 0° C., particularly about −8° C.).

Each of the heat transfer compositions described herein, including Heat Transfer Compositions 1-17, is particularly provided for use in a low temperature refrigeration system (with an evaporator temperature in the range of about −40 to about −12° C., particularly about from about −40° C. to about −23° C. or preferably about −32° C.).

The heat transfer composition of the invention, including Heat Transfer Compositions 1-17, is provided for use in a residential air conditioning system, wherein the residential air-conditioning system is used to supply cool air (said air having a temperature of for example, about 10° C. to about 17° C., particularly about 12° C.) to buildings for example, in the summer.

The heat transfer composition of the invention, including Heat Transfer Compositions 1-17, is thus provided for use in a split residential air conditioning system, wherein the residential air-conditioning system is used to supply cool air (said air having a temperature of for example, about 10° C. to about 17° C., particularly about 12° C.).

The heat transfer composition of the invention, including Heat Transfer Compositions 1-17, is thus provided for use in a ducted split residential air conditioning system, wherein the residential air-conditioning system is used to supply cool air (said air having a temperature of for example, about 10° C. to about 17° C., particularly about 12° C.).

The heat transfer composition of the invention, including Heat Transfer Compositions 1-17, is thus provided for use in a window residential air conditioning system, wherein the residential air-conditioning system is used to supply cool air (said air having a temperature of for example, about 10° C. to about 17° C., particularly about 12° C.).

The heat transfer composition of the invention, including Heat Transfer Compositions 1-17, is thus provided for use in a portable residential air conditioning system, wherein the residential air-conditioning system is used to supply cool air (said air having a temperature of for example, about 10° C. to about 17° C., particularly about 12° C.).

The residential air conditions systems as described herein, including in the immediately preceeding paragraphs, preferably have an air-to-refrigerant evaporator (indoor coil), a compressor, an air-to-refrigerant condenser (outdoor coil), and an expansion valve. The evaporator and condenser can be round tube plate fin, a finned tube or microchannel heat exchanger. The compressor can be a reciprocating or rotary (rolling-piston or rotary vane) or scroll compressor. The expansion valve can be a capillary tube, thermal or electronic expansion valve. The refrigerant evaporating temperature is preferably in the range of 0° C. to 10° C. The condensing temperature is preferably in the range of 40° C. to 70° C.

The heat transfer composition of the invention, including Heat Transfer Compositions 1-17, is provided for use in a residential heat pump system, wherein the residential heat pump system is used to supply warm air (said air having a temperature of for example, about 18° C. to about 24° C., particularly about 21° C.) to buildings in the winter. It can be the same system as the residential air-conditioning system, while in the heat pump mode the refrigerant flow is reversed and the indoor coil becomes condenser and the outdoor coil becomes evaporator. Typical system types are split and mini-split heat pump system. The evaporator and condenser are usually a round tube plate fin, a finned or microchannel heat exchanger. The compressor is usually a reciprocating or rotary (rolling-piston or rotary vane) or scroll compressor. The expansion valve is usually a thermal or electronic expansion valve. The refrigerant evaporating temperature is preferably in the range of about −20 to about 3° C. or about −30° C. to about 5° C. The condensing temperature is preferably in the range of about 35° C. to about 50° C.

The heat transfer composition of the invention, including Heat Transfer Compositions 1-17, is provided for use in a commercial air-conditioning system wherein the commercial air conditioning system can be a chiller which is used to supply chilled water (said water having a temperature of for example about 7° C.) to large buildings such as offices and hospitals, etc. Depending on the application, the chiller system may be running all year long. The chiller system may be air-cooled or water-cooled. The air-cooled chiller usually has a plate, tube-in-tube or shell-and-tube evaporator to supply chilled water, a reciprocating or scroll compressor, a round tube plate fin, a finned tube or microchannel condenser to exchange heat with ambient air, and a thermal or electronic expansion valve. The water-cooled system usually has a shell-and-tube evaporator to supply chilled water, a reciprocating, scroll, screw or centrifugal compressor, a shell-and-tube condenser to exchange heat with water from cooling tower or lake, sea and other natural recourses, and a thermal or electronic expansion valve. The refrigerant evaporating temperature is preferably in the range of about 0° C. to about 10° C. The condensing temperature is preferably in the range of about 40° C. to about 70° C.

The heat transfer composition of the invention, including Heat Transfer Compositions 1-17, is provided for use in a residential air-to-water heat pump hydronic system, wherein the residential air-to-water heat pump hydronic system is used to supply hot water (said water having a temperature of for example about 50° C. or about 55° C.) to buildings for floor heating or similar applications in the winter. The hydronic system usually has a round tube plate fin, a finned tube or microchannel evaporator to exchange heat with ambient air, a reciprocating, scroll or rotary compressor, a plate, tube-in-tube or shell-in-tube condenser to heat the water, and a thermal or electronic expansion valve. The refrigerant evaporating temperature is preferably in the range of about −20° C. to about 3° C., or −30° C. to about 5° C. The condensing temperature is preferably in the range of about 50 to about 90° C.

The heat transfer composition of the invention, including Heat Transfer Compositions 1-17, is provided for use in a medium temperature refrigeration system, wherein the refrigerant has and evaporating temperature preferably in the range of about −12° C. to about 0° C., and in such systems the refrigerant has a condensing temperature preferably in the range of about 40° C. to about 70° C., or about 20° C. to about 70° C.

The present invention thus provides a medium temperature refrigeration system used to chill food or beverages, such as in a refrigerator or a bottle cooler, wherein the refrigerant has an evaporating temperature preferably in the range of about −12° C. to about 0° C., and in such systems the refrigerant has a condensing temperature preferably in the range of about 40° C. to about 70° C., or about 20° C. to about 70° C.

The medium temperature systems of the present invention, including the systems as described in the immediately preceeding paragraphs, preferably have an air-to-refrigerant evaporator to provide chilling, for example to the food or beverage contained therein, a reciprocating, scroll or screw or rotary compressor, an air-to-refrigerant condenser to exchange heat with the ambient air, and a thermal or electronic expansion valve. The heat transfer composition of the invention, including Heat Transfer Compositions 1-17, is provided for use in a low temperature refrigeration system, wherein the refrigerant has an evaporating temperature that is preferably in the range of about −40° C. to about −12° C. and the refrigerant has a condensing temperature that is preferably in the range of about 40° C. to about 70° C., or about 20° C. to about 70° C.

The present invention thus provides a low temperature refrigeration system used to provide cooling in a freezer wherein the refrigerant has an evaporating temperature that is preferably in the range of about −40° C. to about −12° C. and the refrigerant has a condensing temperature that is preferably in the range of about 40° C. to about 70° C., or about 20° C. to about 70° C.

The present invention thus also provides a low temperature refrigeration system used to provide cooling in an cream machine refrigerant has an evaporating temperature that is preferably in the range of about −40° C. to about −12° C. and the refrigerant has a condensing temperature that is preferably in the range of about 40° C. to about 70° C., or about 20 to about 70° C.

The low temperature systems of the present invention, including the systems as described in the immediately preceeding paragraphs, preferably have an air-to-refrigerant evaporator to chill the food or beverage, a reciprocating, scroll or rotary compressor, an air-to-refrigerant condenser to exchange heat with the ambient air, and a thermal or electronic expansion valve.

The present invention therefore provides the use in a chiller of a heat transfer composition of the present invention, including each of Heat Transfer Compositions 1-17 wherein said alkylated naphthalene is AN5 wherein said heat transfer composition further comprises BHT, wherein the AN 5 is provided in an amount of from about 0.001% by weight to about 5% by weight based on the weight of the lubricant and the BHT is provided in an amount of from about 0.001% by weight to about 5% by weight based on the weight of the lubricant.

The present invention therefore provides the use in a chiller of a heat transfer composition of the present invention, including each of Heat Transfer Compositions 1-17 wherein said heat transfer composition further comprises BHT, wherein the AN5 is present in an amount of from about 0.001% by weight to about 5% by weight based on the weight of the heat transfer composition and the BHT is present in an amount of from about 0.001% by weight to about 5% by weight based on the weight of heat transfer composition.

For the purposes of this invention, each heat transfer composition in accordance with the present invention, including each of Heat Transfer Compositions 1-17, is provided for use in a chiller with an evaporating temperature in the range of about 0° C. to about 10° C. and a condensing temperature in the range of about 40° C. to about 70° C. The chiller is provided for use in air conditioning or refrigeration, and preferably for commercial air conditioning. The chiller is preferably a positive displacement chiller, more particularly an air cooled or water cooled direct expansion chiller, which is either modular or conventionally singularly packaged.

The present invention therefore provides the use of each heat transfer composition in accordance with the present invention, including each of Heat Transfer Compositions 1-26, in stationary air conditioning, particularly residential air conditioning, industrial air conditioning or commercial air conditioning.

The present invention therefore provides the use in stationary air conditioning, particularly residential air conditioning, industrial air conditioning or commercial air conditioning, of a heat transfer composition of the present invention, including each of Heat Transfer Compositions 1-17 wherein said alkylated naphthalene is AN5 and wherein said heat transfer composition further comprises BHT, wherein the AN5 is present in an amount of from about 0.001% by weight to about 5% by weight based on the weight of the lubricant and the BHT is present in an amount of from about 0.001% by weight to about 5% by weight based on the weight of the lubricant.

The present invention therefore provides the use in stationary air conditioning, particularly residential air conditioning, industrial air conditioning or commercial air conditioning, of a heat transfer composition of the present invention, including each of Heat Transfer Compositions 1-17 wherein said alkylated naphthalene is AN5 and wherein said heat transfer composition further comprises BHT, wherein the AN5 is present in an amount of from about 0.001% by weight to about 5% by weight based on the weight of the heat transfer composition and the BHT is present in an amount of from about 0.001% by weight to about 5% by weight based on the weight of heat transfer composition.

Each heat transfer composition in accordance with the present invention, including each of Heat Transfer Compositions 1-17, is provided as a low Global Warming (GWP) replacement for the refrigerant R-410A.

Each heat transfer composition in accordance with the present invention, including each of Heat Transfer Compositions 1-17, is provided as a low Global Warming (GWP) retrofit for the refrigerant R-410A.

The heat transfer compositions and the refrigerants of the present invention, including each of Heat Transfer Compositions 1-17, therefore can be used as a retrofit refrigerant/heat transfer composition or as a replacement refrigerant/heat transfer composition.

The present invention thus includes methods of retrofitting existing heat transfer system designed for and containing R-410A refrigerant, without requiring substantial engineering modification of the existing system, particularly without modification of the condenser, the evaporator and/or the expansion valve.

The present invention thus also includes methods of using a refrigerant or heat transfer composition of the present invention as a replacement for R-410A, and in particular as a replacement for R-410A in residential air conditioning refrigerant, without requiring substantial engineering modification of the existing system, particularly without modification of the condenser, the evaporator and/or the expansion valve.

The present invention thus also includes methods of using a refrigerant or heat transfer composition of the present invention as a replacement for R-410A, and in particular as a replacement for R-410A in a residential air conditioning system.

The present invention thus also includes methods of using a refrigerant or heat transfer composition of the present invention as a replacement for R-410A, and in particular as a replacement for R-410A in a chiller system.

There is therefore provided a method of retrofitting an existing heat transfer system that contains R-410A refrigerant, said method comprising replacing at least a portion of the existing R-410A refrigerant with a heat transfer composition of the present invention, including each of Heat Transfer Compositions 1-17.

The step of replacing preferably comprises removing at least a substantial portion of, and preferably substantially all of, the existing refrigerant (which can be but is not limited to R-410A) and introducing a heat transfer composition, including each of Heat Transfer Compositions 1-17, without any substantial modification of the system to accommodate the refrigerant of the present invention. Preferably, the method comprises removing at least about 5%, about 10%, about 25%, about 50%, or about 75% by weight of the R-410A from the system and replacing it with the heat transfer compositions of the invention.

Alternatively, the heat transfer composition can be used in a method of retrofitting an existing heat transfer system designed to contain or containing R410A refrigerant, wherein the system is modified for use with a Heat Transfer Composition of the present invention.

Alternatively, the heat transfer composition can be used as a replacement in a heat transfer system which is designed to contain or is suitable for use with R-410A refrigerant. It will be appreciated that the invention encompasses the use of the heat transfer compositions of the invention, including each of Heat Transfer Compositions 1-17, as a low GWP replacement for R-410A or is used in a method of retrofitting an existing heat transfer system or is used in a heat transfer system which is suitable for use with R-410A refrigerant as described herein.

It will be appreciated by the skilled person that when the heat transfer composition is provided for use in a method of retrofitting an existing heat transfer system as described above, the method preferably comprises removing at least a portion of the existing R-410A refrigerant from the system. Preferably, the method comprises removing at least about 5%, about 10%, about 25%, about 50% or about 75% by weight of the R-410A from the system and replacing it with the heat transfer compositions of the invention, including each of Heat Transfer Compositions 1-17.

The heat transfer compositions of the invention may be employed as a replacement in systems which are used or are suitable for use with R-410A refrigerant, such as existing or new heat transfer systems.

The compositions of the present invention exhibit many of the desirable characteristics of R-410A but have a GWP that is substantially lower than that of R-410A while at the same time having operating characteristics i.e. capacity and/or efficiency (COP) that are substantially similar to or substantially match, and preferably are as high as or higher than R-410A. This allows the claimed compositions to replace R-410A in existing heat transfer systems without requiring any significant system modification for example of the condenser, the evaporator and/or the expansion valve. The composition can therefore be used as a direct replacement for R-410A in heat transfer systems.

The heat transfer compositions of the invention therefore preferably exhibits operating characteristics compared with R-410A wherein the efficiency (COP) of the composition is from 95 to 105% of the efficiency of R-410A in the heat transfer system.

The heat transfer composition of the invention therefore preferably exhibits operating characteristics compared with R-410A wherein the capacity is from 95 to 105% of the capacity of R-410A in the heat transfer system.

The heat transfer composition of the invention therefore preferably exhibits operating characteristics compared with R-410A wherein the efficiency (COP) of the composition is from 95 to 105% of the efficiency of R-410A in the heat transfer system and wherein the capacity is from 95 to 105% of the capacity of R-410A in the heat transfer system.

Preferably, the heat transfer composition of the invention preferably exhibit operating characteristics compared with R-410A wherein:
   the efficiency (COP) of the composition is from 100 to 105% of the efficiency of R-410A; and/or
   the capacity is from 98 to 105% of the capacity of R-410A in heat transfer systems, in which the compositions of the invention are to replace the R-410A refrigerant.

In order to enhance the reliability of the heat transfer system, it is preferred that the heat transfer composition of the invention further exhibit the following characteristics compared with R-410A:
   the discharge temperature is not greater than 10° C. higher than that of R-410A; and/or
   the compressor pressure ratio is from 95 to 105% of the compressor pressure ratio of R-410A
in heat transfer systems, in which the composition of the invention is used to replace the R-410A refrigerant.

The existing heat transfer compositions used to replace R-410A are preferably used in air conditioning heat transfer systems including both mobile and stationary air conditioning systems. As used here, the term mobile air conditioning systems means mobile, non-passenger car air conditioning systems, such as air conditioning systems in trucks, buses and trains. Thus, each of the heat transfer compositions as described herein, including each of Heat Transfer Compositions 1-17, can be used to replace R-410A in any one of:
   an air conditioning system including a mobile air conditioning system, particularly air conditioning systems in trucks, buses and trains,
   a mobile heat pump, particularly an electric vehicle heat pump;
   a chiller, particularly a positive displacement chiller, more particularly an air cooled or water cooled direct expansion chiller, which is either modular or conventionally singularly packaged,
   a residential air conditioning system, particularly a ducted split or a ductless split air conditioning system,
   a residential heat pump,
   a residential air to water heat pump/hydronic system,
   an industrial air conditioning system and
   a commercial air conditioning system particularly a packaged rooftop unit and a variable refrigerant flow (VRF) system;
   a commercial air source, water source or ground source heat pump system The heat transfer composition of the invention is alternatively provided to replace R410A in refrigeration systems. Thus, each of the heat transfer compositions as described herein, including each of Heat Transfer Compositions 1-17, can be used to replace R10A in in any one of:
   a low temperature refrigeration system,
   a medium temperature refrigeration system,
   a commercial refrigerator,
   a commercial freezer,
   an ice machine,
   a vending machine,
   a transport refrigeration system,
   a domestic freezer,
   a domestic refrigerator,
   an industrial freezer,
   an industrial refrigerator and
   a chiller.

Each of the heat transfer compositions described herein, including each of Heat Transfer Compositions 1-17, is particularly provided to replace R-410A in a residential air-conditioning system (with an evaporator temperature in the range of about 0 to about 10° C., particularly about 7° C. for cooling and/or in the range of about −20 to about 3° C. or 30 to about 5° C., particularly about 0.5° C. for heating). Alternatively, or additionally, each of the heat transfer compositions described herein, including each of Heat Transfer Compositions 1-35, is particularly provided to replace R-410A in a residential air conditioning system with a reciprocating, rotary (rolling-piston or rotary vane) or scroll compressor.

Each of the heat transfer compositions described herein, including each of Heat Transfer Compositions 1-17, is particularly provided to replace R-410A in an air cooled chiller (with an evaporator temperature in the range of about 0 to about 10° C., particularly about 4.5° C.), particularly an air cooled chiller with a positive displacement compressor, more particular an air cooled chiller with a reciprocating scroll compressor.

Each of the heat transfer compositions described herein, including each of Heat Transfer Compositions 1-17, is particularly provided to replace R-410A in a residential air to water heat pump hydronic system (with an evaporator temperature in the range of about −20 to about 3° C. or about −30 to about 5° C., particularly about 0.5° C.).

Each of the heat transfer compositions described herein, including each of Heat Transfer Compositions 1-17, is particularly provided to replace R-410A in a medium temperature refrigeration system (with an evaporator temperature in the range of about −12 to about 0° C., particularly about −8° C.).

Each of the heat transfer compositions described herein, including each of Heat Transfer Compositions 1-17, is particularly provided to replace R-410A in a low temperature refrigeration system (with an evaporator temperature in the range of about −40 to about −12° C., particularly from about −40° C. to about −23° C. or preferably about −32° C.).

There is therefore provided a method of retrofitting an existing heat transfer system designed to contain or containing R-410A refrigerant or which is suitable for use with R-410A refrigerant, said method comprising replacing at least a portion of the existing R-410A refrigerant with a heat transfer composition of the present invention, including each of Heat Transfer Compositions 1-17.

There is therefore provided a method of retrofitting an existing heat transfer system designed to contain or containing R-410A refrigerant or which is suitable for use with R-410A refrigerant, said method comprising replacing at least a portion of the existing R-410A refrigerant with a heat transfer composition according to the present invention, including each of Heat Transfer Compositions 1-17.

The invention further provides a heat transfer system comprising a compressor, a condenser and an evaporator in fluid communication, and a heat transfer composition in said system, said heat transfer composition according to the present invention, including each of Heat Transfer Compositions 1-17.

Particularly, the heat transfer system is a residential air-conditioning system (with an evaporator temperature in the range of about 0 to about 10° C., particularly about 7° C. for cooling and/or in the range of about −20 to about 3° C. or about −30 to about 5° C., particularly about 0.5° C. for heating).

Particularly, the heat transfer system is an air cooled chiller (with an evaporator temperature in the range of about 0 to about 10° C., particularly about 4.5° C.), particularly an air cooled chiller with a positive displacement compressor, more particular an air cooled chiller with a reciprocating or scroll compressor.

Particularly, the heat transfer system is a residential air to water heat pump hydronic system (with an evaporator temperature in the range of about −20 to about 3° C. or about −30 to about 5° C., particularly about 0.5° C.).

The heat transfer system can be a refrigeration system, such as a low temperature refrigeration system, a medium temperature refrigeration system, a commercial refrigerator, a commercial freezer, an ice machine, a vending machine, a transport refrigeration system, a domestic freezer, a domestic refrigerator, an industrial freezer, an industrial refrigerator and a chiller.

Example 1—Flammability Testing

The refrigerant composition identified in Table 1 below as Refrigerant A was tested as described herein.

TABLE 1

| Refrigerant A Composition | | | |
| --- | --- | --- | --- |
| Refrigerant | R32 (wt. %) | R125 (wt. %) | CF3I (wt. %) |
| A | 49% | 11.5% | 39.5% |

The flammability testing was performed per ASHRAE's current Standard 34-2016 test protocol (condition and apparatus) using the current method ASTM E681-09 annex A1. Mixtures were made by evacuating the flask and using partial pressures in filling to the desire concentration. The air was introduced rapidly to assist in mixing and allowed to come to temperature equilibrium after mixing to allow the mixture to become stagnate before ignition was attempted The Refrigerant A evaluated in Table 1 above was found to satisfy the Non-Flammability test.

Examples 2—30 Heat Transfer Performance

Refrigerant A as described in Table 1 in Example 1 above was subjected to thermodynamic analysis to determine its ability to match the operating characteristics of R-4104A in various refrigeration systems. The analysis was performed using experimental data collected for properties of the two binary pairs CF3I with each of HFC-32 and HFC-125. In particular, the vapor/liquid equilibrium behavior of CF3I was determined and studied in a series of binary pairs with each of HFC-32 and R125. The composition of each binary pair was varied over a series of relative percentages in the experimental evaluation and the mixture parameters for each binary pair were regressed to the experimentally obtained data. The assumptions used to conduct the analysis were the following: same compressor displacement for all refrigerants, same operating conditions for all refrigerants, same compressor isentropic and volumetric efficiency for all refrigerants. In each Example, simulations were conducted using the measured vapor liquid equilibrium data. The simulation results are reported for each Example.

Example 2A—Residential Air-Conditioning System (Cooling)

A residential air-conditioning system configured to supply cool air (about 12° C.) to buildings in the summer is tested. Residential air condition systems include split air conditioning systems, mini-split air conditioning systems, and window air-conditioning system, and the testing described herein is representative of the results from such systems. The experimental system includes an air-to-refrigerant evaporator (indoor coil), a compressor, an air-to-refrigerant condenser (outdoor coil), and an expansion valve. The operating conditions for the test are:

1. Condensing temperature=about 46° C., (corresponding outdoor ambient temperature of about 35° C.)
2. Condenser sub-cooling=about 5.5° C.
3. Evaporating temperature=about 7° C., (corresponding indoor ambient temperature of about 26.7° C.)
4. Evaporator Superheat=about 5.5° C.
5. Isentropic Efficiency=70%
6. Volumetric Efficiency=100%
7. Temperature Rise in Suction Line=about 5.5° C.

The Performance Results from the Testing are Reported in Table 2 Below:

TABLE 2

| Performance in Residential Air-Conditioning System (Cooling) | | | | | | |
| --- | --- | --- | --- | --- | --- | --- |
| Refrigerant | Capacity | Efficiency | Pressure ratio | Discharge Pressure [kPa] | Discharge Temperature Difference [° C.] | Evaporator Glide [° C.] |
| R410A | 100% | 100% | 100% | 100% | 0 | 0.08 |
| 1 | 98% | 102% | 99% | 95% | 7.8 | 1.11 |

Table 2 shows the thermodynamic performance of a residential air-conditioning system operating with Refrigerant A of the present invention compared to R-410A in the same system. In particular, Refrigerant A exhibits a 98% capacity relative to R-410A and an efficiency of 102% compared to R-410A. This indicates that Refrigerant A is a drop-in or near drop-in as a replacement for R-410A in such systems and as a retrofit for R-410A in such systems Further, Refrigerant A shows a 99% pressure ratio compared to R-410A, which indicates that the compressor efficiencies are sufficiently similar to R-410A that no changes to the compressor used with R-410A are needed. In addition, Refrigerant A shows a compressor discharge temperature rise within 10° C. compared to R-410A, which indicates good compressor reliability with low risk of oil breakdown or motor burn-out. The evaporator glide of less than 2° C. for Refrigerant A indicates the evaporator glide does not affect system performance.

Example 2B—Residential Air-Conditioning System (Cooling)

A residential air-conditioning system was configured to supply cool air (about 12° C.) in accordance with Example 2A in which POE lubricant was included in the system and was stabilized with alkylated naphthalene according to the present invention (AN4 in an amount of from about 6% to about 10% based on the weight of the lubricant) and ADM according to the present invention (ADM4 in an amount of about 0.05-0.5% by weight based on the weight of the lubricant). The system so configured operated continuously for an extended period of days, and after such operation the lubricant was tested and was found to have remained stable during such actual operation.

Example 3A. Residential Heat Pump System (Heating)

A residential heat pump system configured to supply warm air (about 21° C.) to buildings in the winter is tested. The experimental system includes a residential air-conditioning system, however, when the system is in in the heat pump mode the refrigerant flow is reversed and the indoor coil becomes a condenser and the outdoor coil becomes an evaporator. Residential heat pump systems include split air conditioning systems, mini-split air conditioning systems, and window air-conditioning system, and the testing described herein is representative of the results from such systems. The operating conditions for the test are:
1. Condensing temperature=about 41° C. (corresponding indoor ambient temperature of about 21.1° C.)
2. Condenser sub-cooling=about 5.5° C.
3. Evaporating temperature=about 0.5° C. (corresponding outdoor ambient temperature=8.3° C.)
4. Evaporator Superheat=about 5.5° C.
5. Isentropic Efficiency=70%
6. Volumetric Efficiency=100%
7. Temperature Rise in Suction Line=about 5.5° C.

The performance results from the testing are reported in Table 3 below:

Table 3 shows the thermodynamic performance of a residential heat pump system operating with Refrigerant A of the present invention compared to R-410A in the same system. In particular, Refrigerant A exhibits a 97% capacity relative to R-410A and an efficiency of 101% compared to R-410A. This indicates that Refrigerant A is a drop-in or near drop-in as a replacement for R-410A in such systems and as a retrofit for R-410A in such systems. Further, Refrigerant A shows a 99% pressure ratio compared to R-410A, which indicates that the compressor efficiencies are sufficiently similar to R-410A that no changes to the compressor used with R-410A are needed. In addition, Refrigerant A shows a compressor discharge temperature rise within 10° C. compared to R-410A, which indicates good compressor reliability with low risk of oil breakdown or motor burn-out. The evaporator glide of less than 2° C. for Refrigerant A indicates the evaporator glide does not affect system performance.

Example 3B—Residential Heat Pump System (Heating)

A heat pump system was configured in accordance with Example 3A in which POE lubricant was included in the system and was stabilized with alkylated naphthalene according to the present invention (AN4 in an amount of from about 6% to about 10% based on the weight of the lubricant) and ADM according to the present invention (ADM4 in an amount of about 0.05-0.5% by weight based on the weight of the lubricant). The system so configured operated continuously for an extended period of days, and after such operation the lubricant was tested and was found to have remained stable during such actual operation.

Example 4A. Commercial Air-Conditioning System—Chiller

A commercial air-conditioning systems (chillers) configured to supply warm air (about 21° C.) to buildings in the winter is tested. Such systems supply chilled water (about 7° C.) to large buildings such as offices, hospitals, etc., and depending on the specific application, the chiller system may be running all year long. The testing described herein is representative of the results from such systems.
The operating conditions for the test are:
1. Condensing temperature=about 46° C. (corresponding outdoor ambient temperature=35° C.)
2. Condenser sub-cooling=about 5.5° C.
3. Evaporating temperature=about 4.5° C. (corresponding chilled leaving water temperature=about 7° C.)
4. Evaporator Superheat=about 5.5° C.
5. Isentropic Efficiency=70%
6. Volumetric Efficiency=100%
7. Temperature Rise in Suction Line=about 2° C.

TABLE 3

Performance in Residential Heat pump System (Heating)

| Refrigerant | Heating Capacity | Heating Efficiency | Pressure ratio | Discharge Pressure [kPa] | Discharge Temperature Difference [° C.] | Evaporator Glide [° C.] |
|---|---|---|---|---|---|---|
| R-410A | 100% | 100% | 100% | 100% | 0 | 0.08 |
| 1 | 97% | 101% | 99% | 95% | 8.4 | 1.05 |

The performance results from the testing are reported in Table 4 below:

TABLE 4

Performance in Commercial Air-Conditioning System - Air-Cooled Chiller

| Refrigerant | Capacity | Efficiency | Pressure ratio | Discharge Pressure [kPa] | Discharge Temperature Difference [° C.] | Evaporator Glide [° C.] |
|---|---|---|---|---|---|---|
| R-410A | 100% | 100% | 100% | 100% | 0 | 0.08 |
| 1 | 98% | 102% | 99% | 95% | 8.1 | 1.08 |

Table 4 shows the thermodynamic performance of a of a commercial air-cooled chiller system operating with Refrigerant A of the present invention compared to R-410A in the same system. In particular, Refrigerant A exhibits a 98% capacity relative to R-410A and an efficiency of 102% compared to R-410A. This indicates that Refrigerant A is a drop-in or near drop-in as a replacement for R-410A in such systems and as a retrofit for R-410A in such systems. Further, Refrigerant A shows a 99% pressure ratio compared to R-410A, which indicates that the compressor efficiencies are sufficiently similar to R-410A that no changes to the compressor used with R-410A are needed. In addition, Refrigerant A shows a compressor discharge temperature rise within 10° C. compared to R-410A, which indicates good compressor reliability with low risk of oil breakdown or motor burn-out. The evaporator glide of less than 2° C. for Refrigerant A indicates the evaporator glide does not affect system performance.

Example 4B. Commercial Air-Conditioning System—Chiller

A commercial air conditioning configured in accordance with Example 4A in which POE lubricant was included in the system and was stabilized with alkylated naphthalene according to the present invention (AN4 in an amount of from about 6% to about 10% based on the weight of the lubricant) and ADM according to the present invention (ADM4 in an amount of about 0.05-0.5% by weight based on the weight of the lubricant). The system so configured operated continuously for an extended period of days, and after such operation the lubricant was tested and was found to have remained stable during such actual operation.

Example 5A—Residential Air-to-Water Heat Pump Hydronic System

A residential air-to-water heat pump hydronic system configured to supply hot water (about 50° C.) to buildings for floor heating or similar applications in the winter is tested. The testing described herein is representative of the results from such systems. The operating conditions for the test are:
1. Condensing temperature=about 60° C. (corresponding indoor leaving water temperature=about 50° C.)
2. Condenser sub-cooling=about 5.5° C.
3. Evaporating temperature=about 0.5° C. (corresponding outdoor ambient temperature=about 8.3° C.)
4. Evaporator Superheat=about 5.5° C.
5. Isentropic Efficiency=70%
6. Volumetric Efficiency=100%
7. Temperature Rise in Suction Line=2° C.

The performance results from the testing are reported in Table 5 below:

TABLE 5

Performance in Residential Air-to-Water Heat Pump Hydronic System

| Refrigerant | Heating Capacity | Heating Efficiency | Pressure ratio | Discharge Pressure [kPa] | Discharge Temperature Difference [° C.] | Evaporator Glide [° C.] |
|---|---|---|---|---|---|---|
| R-410A | 100% | 100% | 100% | 100% | 0 | 0.06 |
| 1 | 100% | 103% | 98% | 94% | 11.6 | 0.94 |

Table 5 shows the thermodynamic performance of a residential air-to-water heat pump hydronic system operating with Refrigerant A of the present invention compared to R-410A in the same system. In particular, Refrigerant A exhibits a 100% capacity relative to R-410A and an efficiency of 103% compared to R-410A. This indicates that Refrigerant A is a drop-in or near drop-in as a replacement for R-410A in such systems and as a retrofit for R-410A in such systems. Further, Refrigerant A shows a 98% pressure ratio compared to R-410A, which indicates that the compressor efficiencies are sufficiently similar to R-410A that no changes to the compressor used with R-410A are needed. In addition, Refrigerant A shows a compressor discharge temperature rise close to 10° C. compared to R-410A. The evaporator glide of less than 2° C. for Refrigerant A indicates the evaporator glide does not affect system performance.

Example 5B—Residential Air-to-Water Heat Pump Hydronic System

A residential air-to-water heat pump hydronic system configured in accordance with Example 5A in which POE lubricant was included in the system and was stabilized with alkylated naphthalene according to the present invention (AN4 in an amount of from about 6% to about 10% based on the weight of the lubricant) and ADM according to the present invention (ADM4 in an amount of about 0.05-0.5% by weight based on the weight of the lubricant). The system so configured operated continuously for an extended period of days, and after such operation the lubricant was tested and was found to have remained stable during such actual operation.

Example 6A. Medium Temperature Refrigeration System

A medium temperature refrigeration system configured to chill food or beverages such as in a refrigerator and bottle cooler is tested. The experimental system includes an air-to-refrigerant evaporator to chill the food or beverage, a compressor, an air-to-refrigerant condenser to exchange heat with the ambient air, and an expansion valve. The testing described herein is representative of the results from such systems.

The operating conditions for the test are:
1. Condensing temperature=about 45° C. (corresponding outdoor ambient temperature=about 35° C.)
2. Condenser sub-cooling=about 5.5° C.
3. Evaporating temperature=about −8° C. (corresponding box temperature=1.7° C.)
4. Evaporator Superheat=about 5.5° C.
5. Isentropic Efficiency=65%
6. Volumetric Efficiency=100%
7. Temperature Rise in Suction Line=10° C.

The performance results from the testing are reported in Table 6 below:

TABLE 6

Performance in Medium Temperature Refrigeration System

| Refrigerant | Capacity | Efficiency | Pressure ratio | Discharge Pressure [kPa] | Discharge Temperature Difference [° C.] | Evaporator Glide [° C.] |
|---|---|---|---|---|---|---|
| R-410A | 100% | 100% | 100% | 100% | 0 | 0.07 |
| 1 | 100% | 102% | 98% | 95% | 12.5 | 0.92 |

Table 6 shows the thermodynamic performance of a medium temperature refrigeration system operating with Refrigerant A of the present invention compared to R-410A in the same system. In particular, Refrigerant A exhibits a 100% capacity relative to R-410A and an efficiency of 102% compared to R-410A. This indicates that Refrigerant A is a drop-in or near drop-in as a replacement for R-410A in such systems and as a retrofit for R-410A in such systems. Further, Refrigerant A shows a 98% pressure ratio compared to R-410A, which indicates that the compressor efficiencies are sufficiently similar to R-410A that no changes to the compressor used with R-410A are needed. In addition, Refrigerant A shows a compressor discharge temperature rise close to 10° C. compared to R-410A. The evaporator glide of less than 2° C. for Refrigerant A indicates the evaporator glide does not affect system performance.

Example 6B. Medium Temperature Refrigeration System

A medium temperature refrigeration system configured to chill food or beverages such as in a refrigerator and bottle cooler was configured in accordance with Example 6A in which POE lubricant was included in the system and was stabilized with alkylated naphthalene according to the present invention (AN4 in an amount of from about 6% to about 10% based on the weight of the lubricant) and ADM according to the present invention (ADM4 in an amount of about 0.05-0.5% by weight based on the weight of the lubricant). The system so configured operated continuously for an extended period of days, and after such operation the lubricant was tested and was found to have remained stable during such actual operation.

Example 7A. Low Temperature Refrigeration System

A low temperature refrigeration system configured to freeze food such as in an ice cream machine and a freezer is tested. The experimental system includes an air-to-refrigerant evaporator to cool or freeze the food or beverage, a compressor, an air-to-refrigerant condenser to exchange heat with the ambient air, and a expansion valve. The testing described herein is representative of the results from such systems. The operating conditions for the test are:
1. Condensing temperature=about 55° C. (corresponding outdoor ambient temperature=about 35° C.)
2. Condenser sub-cooling=about 5° C.
3. Evaporating temperature=about −23° C. (corresponding box temperature=1.7° C.)
4. Evaporator Superheat=about 5.5° C.
5. Isentropic Efficiency=60%
6. Volumetric Efficiency=100%
7. Temperature Rise in Suction Line=1° C.

The performance results from the testing are reported in Table 7 below:

TABLE 7

Performance in Low Temperature Refrigeration System

| Refrigerant | Capacity | Efficiency | Pressure ratio | Discharge Pressure [kPa] | Discharge Temperature Difference [° C.] | Evaporator Glide [° C.] |
|---|---|---|---|---|---|---|
| R-410A | 100% | 100% | 100% | 100% | 0 | 0.05 |
| 1 | 104% | 105% | 97% | 94% | 20.2 | 0.69 |

Table 7 shows the thermodynamic performance of a low temperature refrigeration system operating with Refrigerant A of the present invention compared to R-410A in the same system. In particular, Refrigerant A exhibits a 104% capacity relative to R-410A and an efficiency of 105% compared to R-410A. Further, Refrigerant A shows a 94% pressure ratio compared to R-410A. The evaporator glide of less than 2° C. for Refrigerant A indicates the evaporator glide does not affect system performance.

Example 7B. Low Temperature Refrigeration System

A low temperature refrigeration system configured to freeze food such as in an ice cream machine and a freezer was configured in accordance with Example 7A in which POE lubricant was included in the system and was stabilized with alkylated naphthalene according to the present invention (AN4 in an amount of from about 6% to about 10% based on the weight of the lubricant) and ADM according to the present invention (ADM4 in an amount of about 0.05-0.5% by weight based on the weight of the lubricant). The system so configured operated continuously for an extended period of days, and after such operation the lubricant was tested and was found to have remained stable during such actual operation.

Example 8A. Commercial Air-Conditioning System—Packaged Rooftops

A packaged rooftop commercial air conditioning system configured to supply cooled or heated air to buildings is tested. The experimental system includes a packaged rooftop air-conditioning/heat pump systems and has an air-to-refrigerant evaporator (indoor coil), a compressor, an air-to-refrigerant condenser (outdoor coil), and an expansion valve. The testing described herein is representative of the results from such systems. The operating conditions for the test are:
1. Condensing temperature=about 46° C. (corresponding outdoor ambient temperature=about 35° C.)
2. Condenser sub-cooling=about 5.5° C.
3. Evaporating temperature=about 7° C. (corresponding indoor ambient temperature=26.7° C.)
4. Evaporator Superheat=about 5.5° C.
5. Isentropic Efficiency=70%
6. Volumetric Efficiency=100%
7. Temperature Rise in Suction Line=5.5° C.

The performance results from the testing are reported in Table 8 below:

Table 8 shows the thermodynamic performance of a rooftop commercial air conditioning system operating with Refrigerant A of the present invention compared to R-410A in the same system. In particular, Refrigerant A exhibits a 98% capacity relative to R-410A and an efficiency of 102% compared to R-410A. This indicates that Refrigerant A is a drop-in or near drop-in as a replacement for R-410A in such systems and as a retrofit for R-410A in such systems. Further, Refrigerant A shows a 99% pressure ratio compared to R-410A, which indicates that the compressor efficiencies are sufficiently similar to R-410A that no changes to the compressor used with R-410A are needed. In addition, Refrigerant A shows a compressor discharge temperature less than 10° C. compared to R-410A, which indicates good compressor reliability and that there is no risk of oil breakdown or motor burn-out. The evaporator glide of less than 2° C. for Refrigerant A indicates the evaporator glide does not affect system performance.

Example 8A. Commercial Air-Conditioning System—Packaged Rooftops

A packaged rooftop commercial air conditioning system configured to supply cooled or heated air to buildings is configured in accordance with Example 8A in which POE lubricant was included in the system and was stabilized with alkylated naphthalene according to the present invention (AN4 in an amount of from about 6% to about 10% based on the weight of the lubricant) and ADM according to the present invention (ADM4 in an amount of about 0.05-0.5% by weight based on the weight of the lubricant). The system so configured operated continuously for an extended period of days, and after such operation the lubricant was tested and was found to have remained stable during such actual operation.

Example 9A—Commercial Air-Conditioning System—Variable Refrigerant Flow Systems A commercial air-conditioning system with variable refrigerant flow is configured to supply cooled or heated air to buildings is tested. The experimental system includes multiple (4 or more) air-to-refrigerant evaporators (indoor coils), a compressor, an air-to-refrigerant condenser (outdoor coil), and an expansion valve. The testing described herein is representative of the results from such systems. The operating conditions for the test are:
1. Condensing temperature=about 46° C., Corresponding outdoor ambient temperature=35° C.
2. Condenser sub-cooling=about 5.5° C.
3. Evaporating temperature=about 7° C. (corresponding indoor ambient temperature=26.7° C.)
4. Evaporator Superheat=about 5.5° C.
5. Isentropic Efficiency=70%
6. Volumetric Efficiency=100%
7. Temperature Rise in Suction Line=5.5° C.

TABLE 8

Performance in Commercial Air-Conditioning System - Packaged Rooftops

| Refrigerant | Capacity | Efficiency | Pressure ratio | Discharge Pressure [kPa] | Discharge Temperature Difference [° C.] | Evaporator Glide [° C.] |
|---|---|---|---|---|---|---|
| R-410A | 100% | 100% | 100% | 100% | 0 | 0.08 |
| 1 | 98% | 102% | 99% | 95% | 8.1 | 1.08 |

TABLE 9

Performance in Commercial Air-Conditioning System - Variable Refrigerant Flow Systems

| Refrigerant | Capacity | Efficiency | Pressure ratio | Discharge Pressure [kPa] | Discharge Temperature Difference [° C.] | Evaporator Glide [° C.] |
|---|---|---|---|---|---|---|
| R-410A | 100% | 100% | 100% | 100% | 0 | 0.08 |
| 1 | 98% | 102% | 99% | 95% | 8.1 | 1.08 |

Table 9 shows the thermodynamic performance of a VRF commercial air conditioning system operating with Refrigerant A of the present invention compared to R-410A in the same system. In particular, Refrigerant A exhibits a 98% capacity relative to R-410A and an efficiency of 102% compared to R-410A. This indicates that Refrigerant A is a drop-in or near drop-in as a replacement for R-410A in such systems and as a retrofit for R-410A in such systems. Further, Refrigerant A shows a 99% pressure ratio compared to R-410A, which indicates that the compressor efficiencies are sufficiently similar to R-410A that no changes to the compressor used with R-410A are needed. In addition, Refrigerant A shows a compressor discharge temperature less than 10° C. compared to R-410A, which indicates good compressor reliability and that there is no risk of oil breakdown or motor burn-out. The evaporator glide of less than 2° C. for Refrigerant A indicates the evaporator glide does not affect system performance.

Example 9B. Commercial Air-Conditioning System—Variable Flow Refrigerant

A commercial air-conditioning system with variable refrigerant flow is configured to supply cooled or heated air to buildings is configured in accordance with Example 9A in which POE lubricant was included in the system and was stabilized with alkylated naphthalene according to the present invention (AN4 in an amount of from about 6% to about 10% based on the weight of the lubricant) and ADM according to the present invention (ADM4 in an amount of about 0.05-0.5% by weight based on the weight of the lubricant). The system so configured operated continuously for an extended period of days, and after such operation the lubricant was tested and was found to have remained stable during such actual operation.

Comparative Example 1—Heat Transfer Compositions Comprising Refrigerant and Lubricant and BHT A heat transfer compositions of the present invention was tested in accordance with ASHRAE Standard 97—"Sealed Glass Tube Method to Test the Chemical Stability of Materials for Use within Refrigerant Systems" to simulate long-term stability of the heat transfer compositions by accelerated aging. The tested refrigerant consists of 49% by weight R-32, 11.5% by weight of R-125 and 39.5% by weight of CF3I (also sometimes referred to herein as R-466a), with 1.7 volume % air in the refrigerant. The POE lubricant tested was an ISO 32 POE having a viscosity at 40° C. of about 32 cSt and having a moisture content of 300 ppm or less (Lubricant A). Included with the lubricant was the stabilizer BHT, but no alkylated naphthalene and no ADM were included. After testing, the fluid was observed for clarity and total acid number (TAN) is determined. The TAN value is considered to reflect the stability of the lubricant in the fluid under conditions of use in the heat transfer composition. The fluid was also tested for the presence of trifluormethane (R-23), which is considered to reflect refrigerant stability since this compound is believed to be a product of the breakdown of CF3I.

The experiment was carried out by preparing sealed tubes containing 50% by weight of the R-466a refrigerant and 50% by weight of the indicated lubricant, each of which has been degassed. Each tube contains a coupon of steel, copper, aluminum and bronze. The stability was tested by placing the sealed tube in an oven maintained at about 175° C. for 14 days. The results were as follows:

Lubricant Visual—yellow to brown
TAN—4.0 mgKOH/g
R-23—1.157 wt %

Example 10—Stabilizers for Heat Transfer Compositions Comprising Refrigerant and Lubricant The test of Comparative Example 1 was repeated except that 2% by weight of alkylated naphthalene (AN4) based on the weight of the lubricant is added. The results (designated E10) are reported in Table 10 below, together with the results from Comparative Example 1 (designated CE1).

TABLE 10

|  | CE1 (no AN) | E10 (2% AN) |
|---|---|---|
| Lubricant Visual | yellow to brown | Clear |
| TAN mgKOH/g | 4.0 | 0.15 |
| R-23 -wt % | 1.157 | 0.135 |

As can be seen from the data above, the refrigerant/lubricant fluid without the alkylate naphthalene stabilizer according to the present invention exhibits a less than ideal visual appearance, a TAN of 4 and a relatively high R-23 concentration. This results are achieved notwithstanding that BHT stabilizer is included. In contrast, the addition of 2% alkylated naphthalene according to the present invention produces a dramatic and unexpected improvement in all tested stability results, including a dramatic, order of magnitude improvement in both TAN and R-23 concentration.

Example 11—Stabilizers for Heat Transfer Compositions Comprising Refrigerant and Lubricant The test of Example 10 is repeated except that 4% by weight of alkylated naphthalene (AN4) based on the weight of the lubricant is added. The results are similar to the results of Example 10.

Example 12—Stabilizers for Heat Transfer Compositions Comprising Refrigerant and Lubricant The test of Example 10 is repeated except that 6% by weight of alkylated naphthalene (AN4) based on the weight of the lubricant is added. The results are similar to the results of Example 10.

Example 13—Stabilizers for Heat Transfer Compositions Comprising Refrigerant and Lubricant The test of Example 10 is repeated except that 8% by weight of alkylated naphthalene (AN4) based on the weight of the lubricant is added. The results are similar to the results of Example 10.

Example 14—Stabilizers for Heat Transfer Compositions Comprising Refrigerant and Lubricant The test of Comparative Example 1 was repeated except that 10% by weight of alkylated naphthalene (AN4) based on the weight of the lubricant is added. The results (designated E14) are reported in Table 11 below, together with the results from Comparative Example 1 (designated CE1) and Example 10 (designated E10).

TABLE 11

| | CE1 (No AN) | E10 (2% AN) | E14 (10% AN) |
|---|---|---|---|
| Lubricant Visual | yellow to brown | Clear | Dark Brown to Black |
| TAN mgKOH/g | 4.0 | 0.15 | 18.2 |
| R-23 -wt % | 1.157 | 0.135 | 1.602 |

As can be seen from the data above, the refrigerant/lubricant fluid with 10% alkylated naphthalene stabilizer (and no ADM) unexpectedly exhibits a substantial deterioration in stabilizing performance for each criteria tested compared to the fluid with the AN level of 2%.

Example 15—Stabilizers for Heat Transfer Compositions Comprising Refrigerant and Lubricant The test of Example 14 was repeated except that in addition to the 10% by weight of alkylated naphthalene (AN4) based on the weight of the lubricant being added, 1000 ppm by weight (0.1% by weight) of ADM (ADM4) is also added. The results (designated E15) are reported in Table 12 below, together with the results from Comparative Example 1 (designated CE1), Example 10 (designated E10) and Example 14 (designated E14).

TABLE 12

| | CE1 (No AN) | E10 (2% AN) | E14 (10% AN) | E15 (10% AN + 0.1% ADM) |
|---|---|---|---|---|
| Lubricant Visual | yellow to brown | Clear | Dark Brown to Black | Crysal clear |
| TAN mgKOH/g | 4.0 | 0.15 | 18.2 | <.1 |
| R-23 -wt % | 1.157 | 0.135 | 1.602 | 0.005 |

As can be seen from the data above, the refrigerant/lubricant fluid with 10% alkylated naphthalene stabilizer and 0.1% by weight (1000 ppm) ADM unexpectedly exhibits the best performance, with an R-23 value that is two orders of magnitude better than even the excellent results from Example 10.

Example 16—Stabilizers for Heat Transfer Compositions Comprising Refrigerant and Lubricant The test of Example 15 was repeated except that the lubricant was an ISO 74 POE having a viscosity at 40° C. of about 74 cSt and having a moisture content of 300 ppm or less (Lubricant B). The results were as follows:
Lubricant Visual—clear to slight yellow
TAN—<0.1 mgKOH/g
R-23—<0.012 wt %

Example 17—Stabilizers for Heat Transfer Compositions Comprising Refrigerant and Lubricant The test of Example 15 was repeated except that the lubricant was an ISO 68 PVE having a viscosity at 40° C. of about 68 cSt and having a moisture content of 300 ppm or less (Lubricant c). The results were as follows:
Lubricant Visual—crystal clear
TAN—<0.1 mgKOH/g
R-23—0.028 wt %

Example 18—Stabilizers for Heat Transfer Compositions Comprising Refrigerant and Lubricant The test of Example 15 was repeated except that the lubricant was an ISO 32 PVE having a viscosity at 40° C. of about 32 cSt and having a moisture content of 300 ppm or less (Lubricant c). The results were similar to the results from Example 17.

Example 19—Miscibility with POE Oil

Miscibility of ISO POE-32 oil (having a viscosity at about 32 cSt at a temperature of 40° C.) is tested for different weight ratios of lubricant and refrigerant and different temperatures for R-410A refrigerant and for Refrigerant A as specified in Table 1 for Example 1 above. The results of this testing are reported in Table 11 below:

TABLE 13

| Liquid Refrigerant Mass Percentage in the Refrigerant and Lubricant Mixture, % | R-410A Miscibility Temperature Range | | Refrigerant A of the present invention |
|---|---|---|---|
| | Lower Limit, ° C. | Upper Limit, ° C. | |
| 60 | about −26 | NA | Fully miscible |
| 70 | about −23 | about 55 | Fully miscible |
| 80 | about −22 | about 48 | Fully miscible |
| 90 | about −31 | about 50 | Fully miscible |

As can be seen from the table above, R-410A is immiscible with POE oil below about −22° C., and R-410A cannot therefore be used in low temperature refrigeration applications without make provisions to overcome the accumulation of POE oil in the evaporator. Furthermore, R-410A is immiscible with POE oil above 50° C., which will cause problems in the condenser and liquid line (e.g. the separated POE oil will be trapped and accumulated) when R-410A is used in high ambient conditions. Conversely, applicants have surprisingly and unexpectedly found that refrigerants of the present invention are fully miscible with POE oil across a temperature range of −40° C. to 80° C., thus providing a substantial and unexpected advantage when used in such systems.

Numbered Embodiments

The invention will now be illustrated by reference to the following numbered embodiments. The subject matter of the numbered embodiments may be additionally combined with subject matter from the description or from one or more of the claims.

Numbered Embodiment 1. A heat transfer compositions comprising refrigerant, lubricant and stabilizer, said refrigerant consisting essentially of the following three compounds, with each compound being present in the following relative percentages: about 49% by weight difluoromethane (HFC-32), about 11.5% by weight pentafluoroethane (HFC-125), and about 39.5% by weight trifluoroiodomethane (CF3I), said lubricant comprising polyol ester (POE) lubricant and/or polyvinyl ether (PVE) lubricant, and said stabilizer comprising alkylated naphthalene.

Numbered Embodiment 2. A heat transfer composition according to Number Embodiment 1 wherein said alkylated naphthalene is present in the composition in an amount of from 1% to less than 10%.

Numbered Embodiment 3. A heat transfer composition according to Number Embodiment 1 wherein said alkylated naphthalene is present in the composition in an amount of from 1.5% to less than 10%.

Numbered Embodiment 4. A heat transfer composition according to Number Embodiment 1 wherein said alkylated naphthalene is present in the composition in an amount of from 1.5% to less than 8%.

Numbered Embodiment 5. A heat transfer composition according to Number Embodiment 1 wherein said alkylated naphthalene is present in the composition in an amount of from 1.5% to less than 6%.

Numbered Embodiment 6. A heat transfer composition according to Number Embodiment 1 wherein said alkylated naphthalene is present in the composition in an amount of from 1.5% to less than 5%.

Numbered Embodiment 7. A heat transfer composition according to any of Number Embodiments 1-6 wherein said refrigerant consists essentially of the following three compounds, with each compound being present in the following relative percentages: 49%+/−0.3% by weight difluoromethane (HFC-32), 11.5%+/−0.3% by weight pentafluoroethane (HFC-125), and 39.5%+/−0.3% by weight trifluoroiodomethane ($CF_3I$).

Numbered Embodiment 8. A heat transfer composition according to any of Number Embodiments 1-7 wherein said alkylated naphthalene is selected from AN1, or AN2, or AN3, or AN4, or AN5, or AN6, or AN7, or AN8, or AN9 or AN10.

Numbered Embodiment 9. A heat transfer composition according to any of Number Embodiments 1-8 wherein said alkylated naphthalene comprises AN5.

Numbered Embodiment 10. A heat transfer composition according to any of Number Embodiments 1-8 wherein said alkylated naphthalene consists essentially of AN5.

Numbered Embodiment 11. A heat transfer composition according to any of Number Embodiments 1-8 wherein said alkylated naphthalene consists of AN5.

Numbered Embodiment 12. A heat transfer composition according to any of Number Embodiments 1-8 wherein said alkylated naphthalene comprises AN10.

Numbered Embodiment 13 A heat transfer composition according to any of Number Embodiments 1-8 wherein said alkylated naphthalene consists essentially of AN10.

Numbered Embodiment 14. A heat transfer composition according to any of Number Embodiments 1-8 wherein said alkylated naphthalene consists of AN10.

Numbered Embodiment 15. A heat transfer composition according to any of Number Embodiments 1-14 wherein said stabilizer further comprises an ADM.

Numbered Embodiment 16. A heat transfer composition according to any of Number Embodiments 1-15 wherein said ADM comprises ADM4.

Numbered Embodiment 17 A heat transfer composition according to any of Number Embodiments 1-15 wherein said ADM consists essentially of ADM4.

Numbered Embodiment 18. A heat transfer composition according to any of Number Embodiments 1-15 wherein said ADM naphthalene consists of ADM4.

Numbered Embodiment 19. A heat transfer composition according to any of Number Embodiments 1-9 wherein said stabilizer is selected from Stabilizer 1, Stabilizer 2, Stabilizer 3, Stabilizer 4, Stabilizer 5, Stabilizer 6, Stabilizer 7, Stabilizer 8, Stabilizer 9, Stabilizer 10, Stabilizer 11, Stabilizer 12, Stabilizer 13, Stabilizer 14, Stabilizer 15, Stabilizer 16, Stabilizer 17, Stabilizer 18, Stabilizer 19, Stabilizer 20.

Numbered Embodiment 20 A heat transfer composition according to any of Number Embodiments 1-19 wherein said lubricant comprises POE.

Numbered Embodiment 21. A heat transfer composition according to any of Number Embodiments 1-19 wherein said lubricant consists essentially of POE.

Numbered Embodiment 22. A heat transfer composition according to any of Number Embodiments 1-19 wherein said lubricant consists of POE.

Numbered Embodiment 23. A heat transfer composition according to any of Number Embodiments 1-22 wherein said lubricant comprises Lubricant 1.

Numbered Embodiment 24. A heat transfer composition according to any of Number Embodiments 1-22 wherein said lubricant consists essentially of Lubricant 1.

Numbered Embodiment 25. A heat transfer composition according to any of Number Embodiments 1-22 wherein said lubricant consists of Lubricant 1.

Numbered Embodiment 26. A heat transfer composition according to any of Number Embodiments 1-19 wherein said lubricant comprises PVE.

Numbered Embodiment 27. A heat transfer composition according to any of Number Embodiments 1-19 wherein said lubricant consists essentially of PVE.

Numbered Embodiment 28. A heat transfer composition according to any of Number Embodiments 1-19 wherein said lubricant consists of PVE.

Numbered Embodiment 29. The heat transfer compositions of any one of Numbered Embodiments 1 to 28, wherein the composition further comprises one or more component selected from the group consisting of a dye, a solubilizing agent, a compatibilizer, a corrosion inhibitor, an extreme pressure additive and an anti-wear additive.

Numbered Embodiment 30. The heat transfer composition of Numbered Embodiments 1-29, wherein the stabilizer further comprises a phenol-based compound.

Numbered Embodiment 31. The heat transfer composition of Numbered Embodiments 1-30 wherein the stabilizer further comprises a phosphorus compound and/or a nitrogen compound.

Numbered Embodiment 32. The heat transfer composition of any one of Numbered Embodiments 1 to 8 and 15 to 31, wherein the alkylated naphthalene is one or more of NA-LUBE KR-007A; KR-008, KR-009; KR-0105, KR-019 and KR-005FG.

Numbered Embodiment 33. The heat transfer composition of any one of Numbered Embodiments 1 to 8 and 15-31, wherein the alkylated naphthalene is one or more of NA-LUBE KR-007A, KR-008, KR-009 and KR-005FG.

Numbered Embodiment 34. The heat transfer composition of any one of Numbered Embodiments 1 to 33 wherein the alkylated naphthalene is NA-LUBE KR-008.

Numbered Embodiment 35. The heat transfer composition of any one of Numbered Embodiments 1-34, wherein the stabilizer comprises a phenol based compound selected from 4,4'-methylenebis(2,6-di-tert-butylphenol); 4,4'-bis(2,6-di-tert-butylphenol); 2,2- or 4,4-biphenyldiols, including 4,4'-bis(2-methyl-6-tert-butylphenol); derivatives of 2,2- or 4,4-biphenyldiols; 2,2'-methylenebis(4-ethyl-6-tert-butylphenol); 2,2'-methylenebis(4-methyl-6-tert-butylphenol); 4,4-butylidenebis(3-methyl-6-tert-butylphenol); 4,4-isopropylidenebis(2,6-di-tert-butylphenol); 2,2'-methylenebis(4-methyl-6-nonylphenol); 2,2'-isobutylidenebis(4,6-dimethylphenol); 2,2'-methylenebis(4-methyl-6-cyclohexylphenol); 2,6-di-tert-butyl-4-methylphenol (BHT); 2,6-di-tert-butyl-4-ethylphenol: 2,4-dimethyl-6-tert-butylphenol; 2,6-di-tert-alpha-dimethylamino-p-cresol; 2,6-di-tert-butyl-4(N,N'-dimethylaminomethylphenol); 4,4'-thiobis(2-methyl-6-tert-butylphenol); 4,4'-thiobis(3-methyl-6-tert-butylphenol); 2,2'-thiobis(4-methyl-6-tert-butylphenol); bis(3-methyl-4-hydroxy-5-tert-butylbenzyl) sulfide; bis (3,5-di-tert-butyl-4-hydroxybenzyl)sulfide, tocopherol, hydroquinone, 2,2'6,6'-tetra-tert-butyl-4,4'-methylenediphenol and t-butyl hydroquinone.

Numbered Embodiment 36. The heat transfer composition of any one of Numbered Embodiments 30 to 34, wherein the stabilizer comprises BHT.

Numbered Embodiment 37. The heat transfer composition of any one of Numbered Embodiments 30 to 34, wherein the phenol consists essentially of BHT.

Numbered Embodiment 38. The heat transfer composition of any one of Numbered Embodiments 30 to 34, wherein the phenol consists of BHT.

Numbered Embodiment 39. The heat transfer composition of Numbered Embodiment 30 to 35 wherein said phenol is present in the heat transfer composition in an amount of greater than 0 and preferably from 0.0001% by weight to about 5% by weight, preferably 0.001% by weight to about 2.5% by weight, and more preferably from 0.01% to about 1% by weight, where percentage by weight refers to the weight of the heat transfer composition.

Numbered Embodiment 40. The heat transfer composition of Numbered Embodiment 30 to 35 wherein said phenol is present in the heat transfer composition in an amount of greater than 0 and preferably from 0.0001% by weight to about 5% by weight, preferably 0.001% by weight to about 4% by weight, and more preferably from 1% to 4% by weight, where percentage by weight refers to the weight of the lubricant eat transfer composition.

Numbered Embodiment 41. A heat transfer system comprising a compressor, an evaporator, a condenser and an expansion device, in fluid communication with each other, and a heat transfer composition as defined in any one of Numbered Embodiments 1 to 40.

Numbered Embodiment 42. A heat transfer system according to Number Embodiment 41 and further comprising a sequestration material, wherein said sequestration material comprises: i. copper or a copper alloy, or ii. activated alumina, or iii. a zeolite molecular sieve comprising copper, silver, lead or a combination thereof, or iv. an anion exchange resin, or v. a moisture-removing material, preferably a moisture-removing molecular sieve, or vi. a combination of two or more of the above.

Numbered Embodiment 43. The heat transfer system as defined in any one of Numbered Embodiments 41 and 42, wherein said system is a residential air conditioning system, or an industrial air conditioning system, or a commercial air conditioning system.

Numbered Embodiment 44. A method of cooling in a heat transfer system comprising an evaporator, a condenser and a compressor, the process comprising i) condensing a refrigerant as required the heat transfer composition of any of Numbered Embodiments 1-33; and ii) evaporating the refrigerant in the vicinity of body or article to be cooled; wherein the evaporator temperature of the heat transfer system is in the range of from about −40° C. to about +10° C.

Numbered Embodiment 45. A method of cooling in a heat transfer system comprising an evaporator, a condenser and a compressor, the process comprising i) condensing a refrigerant as required the heat transfer composition of any of Numbered Embodiments 1-33; and ii) evaporating the composition; wherein the evaporator temperature of the heat transfer system is in the range of about −30° C. to about 5° C.

Numbered Embodiment 46. The use of a heat transfer composition as defined in any one of as required the heat transfer composition of any of Numbered Embodiments 1-33 for use in air conditioning.

Numbered Embodiment 47. The use of a heat transfer composition as defined in Numbered Embodiment 46 wherein said use in air conditioning is selected from use in a residential air conditioning system, an industrial air conditioning system, or a commercial air conditioning system, or a commercial air conditioning system that is a roof top system, or a commercial air conditioning system that is a variable refrigerant flow system, or a commercial air conditioning system that is a chiller system, or a transport air conditioning system, or a stationary air conditioning.

Numbered Embodiment 48. The use of a heat transfer composition as defined in any one of as required the heat transfer composition of any of Numbered Embodiments 1-33 for use in a mobile heat pump, or a positive displacement chiller, or in an air cooled or water cooled direct expansion chiller, or in a residential heat pump, a residential air to water heat pump/hydronic system, or a commercial air source, water source or ground source heat pump system, or in a refrigeration system, low temperature refrigeration system, or in a medium temperature refrigeration system, or in a commercial refrigerator, or in a commercial freezer, or in an ice machine, or in a transport refrigeration system, or a domestic freezer, or in a domestic refrigerator, or in an industrial freezer, or in an industrial refrigerator, or in a chiller.

Numbered Embodiment 49. The use of a heat transfer composition as defined in Numbered Embodiment 46 wherein said use in air conditioning is selected from use in a residential air conditioning system with a reciprocating, rotary (rolling-piston or rotary vane) or scroll compressor, or a split residential air conditioning system, or a ducted residential air conditioning system, or a window residential air conditioning system, or a portable residential air conditioning system, or a medium temperature refrigeration system.

Numbered Embodiment 50. The use of a heat transfer composition as required by any one of Numbered Embodiments 1 to 33, for use as a replacement for R410A.

Numbered Embodiment 51. A method of retrofitting an existing heat transfer system designed to contain or containing R-410A refrigerant or which is suitable for use with R-410A refrigerant, said method comprising replacing at least a portion of the existing R-410A refrigerant with a heat transfer composition as defined in Numbered Embodiments 1-33.

Numbered Embodiment 52. The method of Numbered Embodiment 51, wherein the use of the heat transfer composition as defined in Numbered Embodiments 1 to 33 to replace R410A does not require modification of the condenser, the evaporator and/or the expansion valve in the heat transfer system.

Numbered Embodiment 53. The method of Numbered Embodiment 51, wherein the use of the heat transfer composition as defined in Numbered Embodiments 1 to 33 is provided as a replacement for R-410A in a chiller system, or a residential air conditioning system, or a industrial air conditioning system, or in commercial air conditioning system, or commercial air conditioning system is a roof top system, or commercial air conditioning system that is a variable refrigerant flow system, or in a commercial air conditioning system that is a chiller system.

Numbered Embodiment 54. The method of Numbered Embodiments 51 to 53 comprising removing at least about 5%, by weight of the R-410A from the system and replacing it with the heat transfer composition as defined in Numbered Embodiments 1 to 33.

The invention claimed is:

1. A heat transfer compositions comprising refrigerant, lubricant and stabilizer, said refrigerant consisting of the following three compounds, with each compound being present in the following relative percentages:
about 49% by weight difluoromethane (HFC-32),
about 11.5% by weight pentafluoroethane (HFC-125), and
about 39.5% by weight trifluoroiodomethane (CF3I),
wherein (i) said lubricant comprises polyol ester (POE) lubricant and/or polyvinyl ether (PVE) lubricant, (ii) said stabilizer comprises alkylated naphthalene, and (iii) said alkylated naphthalene is present in the composition in an amount of from 1% to less than 10% by weight based on the weight of the alkylated naphthalene and the lubricant.

2. The heat transfer composition of claim 1 wherein said alkylated naphthalene is present in the composition in an amount of from 1% to 8% by weight based on the weight of the alkylated naphthalene and the lubricant.

3. The heat transfer composition of claim 1 wherein said alkylated naphthalene is present in the composition in an amount of from 1.5% to 8% by weight based on the weight of the alkylated naphthalene and the lubricant.

4. The heat transfer composition of claim 1 wherein said alkylated naphthalene is present in the composition in an amount of from 1.5% to about 6% by weight based on the weight of the alkylated naphthalene and the lubricant.

5. The heat transfer composition claim 4 wherein said lubricant comprises PVE lubricant.

6. The heat transfer composition claim 5 wherein said stabilizer further comprises an acid depleting moiety (ADM).

7. The heat transfer composition claim 6 wherein said stabilizer comprises from about 40% by weight to about 99.9% of alkylated naphthalene and from 0.05% to about 50% by weight of ADM based on the weight of the stabilizer.

8. The heat transfer composition of claim 7 wherein said alkylated naphthalene comprises AN5.

9. The heat transfer composition of claim 8 wherein said stabilizer further comprises a phenol.

10. The heat transfer composition of claim 9 wherein said phenol comprises BHT.

11. The heat transfer composition of claim 7 wherein said stabilizer alkylated naphthalene comprises AN10.

12. The heat transfer composition of claim 8 wherein said stabilizer further comprises a phenol.

13. The heat transfer composition of claim 12 wherein said phenol comprises BHT and said ADM comprises ADM4.

14. The heat transfer composition of claim 13 wherein said ADM consists essentially of ADM4.

15. The heat transfer composition of claim 14 wherein said lubricant comprises POE.

16. The heat transfer composition of claim 15 wherein said POE lubricant comprises neopentyl POE.

17. The heat transfer composition of claim 15 wherein said POE lubricant has a viscosity at 40° C. measured in accordance with ASTM D445 of from about 30 cSt to about 70 cSt.

18. The heat transfer composition of claim 17 wherein said POE lubricant has a viscosity measured @ 100° C. in accordance with ASTM D445 of from about 5 cSt to about 10 cSt.

19. The heat transfer composition of claim 18 wherein said alkylated naphthalene consists essentially of AN5.

20. The heat transfer composition of claim 18 wherein said alkylated naphthalene consists of AN5.

* * * * *